(12) United States Patent
Davidson

(10) Patent No.: US 11,176,762 B2
(45) Date of Patent: *Nov. 16, 2021

(54) METHOD FOR TELEMATICALLY PROVIDING VEHICLE COMPONENT RATING

(71) Applicant: GEOTAB INC., Oakville (CA)

(72) Inventor: Mark J. Davidson, Alpharetta, GA (US)

(73) Assignee: Geotab Inc., Ontario (CA)

(*) Notice: Subject to any disclaimer, the term of this patent is extended or adjusted under 35 U.S.C. 154(b) by 192 days.

This patent is subject to a terminal disclaimer.

(21) Appl. No.: 16/551,977

(22) Filed: Aug. 27, 2019

(65) Prior Publication Data

US 2019/0385387 A1 Dec. 19, 2019

Related U.S. Application Data

(63) Continuation-in-part of application No. 16/225,582, filed on Dec. 19, 2018.

(60) Provisional application No. 62/627,996, filed on Feb. 8, 2018.

(51) Int. Cl.
*G07C 5/08* (2006.01)
*H04L 29/08* (2006.01)
*G07C 5/00* (2006.01)

(52) U.S. Cl.
CPC ............. *G07C 5/085* (2013.01); *G07C 5/008* (2013.01); *H04L 67/12* (2013.01)

(58) Field of Classification Search
USPC ........................................................ 701/29.4
See application file for complete search history.

(56) References Cited

U.S. PATENT DOCUMENTS

| | | | |
|---|---|---|---|
| 7,164,117 B2 | 1/2007 | Breed et al. | |
| 9,342,933 B2 | 5/2016 | Olsen, III et al. | |
| 10,713,864 B2 | 7/2020 | Kyes et al. | |
| 10,719,997 B1 | 7/2020 | Aiello et al. | |
| 2005/0046584 A1 | 3/2005 | Breed | |
| 2005/0091642 A1* | 4/2005 | Miller ................ | G06F 11/3664 717/124 |
| 2006/0208169 A1 | 9/2006 | Breed et al. | |

(Continued)

FOREIGN PATENT DOCUMENTS

| | | |
|---|---|---|
| CN | 106965685 A | 7/2017 |
| EP | 3038048 A1 | 6/2016 |

(Continued)

OTHER PUBLICATIONS

Extended European Search Report for European Application No. 18206431.1, dated Jun. 12, 2019.

(Continued)

*Primary Examiner* — Tyler D Paige
(74) *Attorney, Agent, or Firm* — Hartman Global IP Law; Gary M. Hartman; Domenica N. S. Hartman

(57) ABSTRACT

Apparatus, device, methods and system relating to a vehicular telemetry environment for monitoring vehicle components and providing indications towards the rating condition of the vehicle components and providing optimal indications towards replacement or maintenance of vehicle components before vehicle component failure are disclosed.

27 Claims, 23 Drawing Sheets

(56) References Cited

U.S. PATENT DOCUMENTS

| | | | |
|---|---|---|---|
| 2007/0028219 A1* | 2/2007 | Miller | G06F 11/3409 |
| | | | 717/124 |
| 2007/0034009 A1* | 2/2007 | Pado | G01N 29/42 |
| | | | 73/579 |
| 2007/0294121 A1 | 12/2007 | Galt et al. | |
| 2009/0177439 A1* | 7/2009 | Samples | G05B 23/0272 |
| | | | 702/179 |
| 2009/0254240 A1 | 10/2009 | Olsen, III et al. | |
| 2010/0023307 A1* | 1/2010 | Lee | G06K 9/6226 |
| | | | 703/7 |
| 2010/0269776 A1* | 10/2010 | Mizuno | F02N 11/0825 |
| | | | 123/179.4 |
| 2011/0082621 A1 | 4/2011 | Berkobin et al. | |
| 2011/0202225 A1 | 8/2011 | Willis et al. | |
| 2011/0202305 A1 | 8/2011 | Willis et al. | |
| 2013/0079964 A1* | 3/2013 | Sukkarie | G01C 21/3697 |
| | | | 701/22 |
| 2015/0105968 A1 | 4/2015 | Ho | |
| 2015/0154816 A1* | 6/2015 | Chen | G01R 31/3835 |
| | | | 701/29.1 |
| 2015/0224845 A1 | 8/2015 | Anderson et al. | |
| 2016/0104123 A1* | 4/2016 | Viswanath | G06F 16/245 |
| | | | 705/305 |
| 2016/0308257 A1 | 10/2016 | Butzmann | |
| 2019/0241092 A1 | 8/2019 | Kyes et al. | |
| 2019/0244440 A1 | 8/2019 | Kyes et al. | |
| 2019/0244441 A1 | 8/2019 | Kyes et al. | |
| 2019/0244442 A1 | 8/2019 | Kyes et al. | |
| 2019/0244445 A1 | 8/2019 | Kyes et al. | |
| 2019/0385385 A1* | 12/2019 | Davidson | G07C 5/085 |
| 2019/0385386 A1 | 12/2019 | Davidson | |

FOREIGN PATENT DOCUMENTS

| | | | |
|---|---|---|---|
| WO | 2009158225 A2 | 12/2009 | |
| WO | 2010011918 A2 | 1/2010 | |

OTHER PUBLICATIONS

Extended European Search Report for European Application No. 18207004.5, dated May 20, 2019.

Extended European Search Report for European Application No. 18210384.6, dated Jun. 21, 2019.

Extended European Search Report for European Application No. 18212159.0, dated Jun. 24, 2019.

Extended European Search Report for European Application No. 18214003.8, dated Jun. 26, 2019.

* cited by examiner

METHOD FOR TELEMATICALLY PROVIDING VEHICLE COMPONENT RATING

REFERENCE TO CROSS RELATED APPLICATIONS

This application is a continuation-in-part of application Ser. No. 16/225,582 filed Dec. 19, 2018 entitled Telematically Monitoring a Condition of an Operational Vehicle Component which claims the benefit of and priority to U.S. Provisional Patent Application Ser. No. 62/627,996 filed Feb. 8, 2018 entitled Telematics Predictive Vehicle Component Monitoring System and which applications are incorporated herein by reference. To the extent appropriate, a claim of priority is made to each of the above disclosed applications.

This application is related to concurrently filed application Ser. No. 16/551,956 entitled SYSTEM FOR TELEMATICALLY PROVIDING VEHICLE COMPONENT RATING, and to concurrently filed application Ser. No. 16/551,910 entitled TELEMATICALLY PROVIDING REMAINING EFFECTIVE LIFE INDICATIONS FOR OPERATIONAL VEHICLE COMPONENTS.

TECHNICAL FIELD

The present disclosure generally relates to a system, method and apparatus for fleet management in vehicular telemetry environments. More specifically, the present disclosure relates to monitoring and predicting component maintenance before an actual component failure to maximize maintainability and operational status of a fleet of vehicles thereby avoiding a vehicle breakdown.

BACKGROUND

Maintainability and identification of component failure is an important aspect of fleet management. One past approach is to consider the Mean Time Between Failure engineering data to predict the elapsed time between inherent failures during normal operation of the vehicle. Another past approach is to apply the manufacturer's recommended vehicle maintenance schedule. These past approaches are based upon a running total of mileage or running total of operational time. Simple comparisons of numbers are limited and inconclusive. Comparing a current value with some previous value cannot accurately predict component failure.

One past application of telematics is U.S. Pat. No. 6,609,051 (Ser. No. 09/948,938) issued to Feichter et al on Aug. 19, 2003 for a method and system for condition monitoring of vehicles.

Another past application of telematics is U.S. Pat. No. 8,244,779 (Ser. No. 13/253,599) issued to Borg & Copeland on Aug. 14, 2012 for a method and system for monitoring a mobile equipment fleet. Another past application of telematics is U.S. Pat. No. 9,734,528 (Ser. No. 14/203,619) issued to Gormley on Aug. 15, 2017 for a vehicle customization and personalization activities. Another past application of telematics is U.S. Pat. No. 9,747,626 (Ser. No. 14/582,414) issued to Gormley on Aug. 29, 2017 for a vehicle customization and personalization activities.

SUMMARY

The present disclosure is directed to aspects in a vehicular telemetry environment. A new capability to process historical life cycle vehicle component operational (usage) data and derive parameters to indicate vehicle component operational status may be provided. A new capability for rating vehicle component health before actual component failure thereby maximizing maintainability and operational status for each vehicle in a fleet of vehicles may also be provided.

According to a first broad aspect there is provided a method for identifying real time component health status parameters of a vehicle component. The method comprises accessing at least one record of operational component data, the operational component data including operational values from at least one vehicle component from at least one vehicle, the operational values representative of operational life cycle use of the at least one vehicle component, the operational values further based upon a measured component event; determining at least one threshold operational value representative of health of the vehicle component based upon the measured component event; and associating the operational component data and the at least one threshold operational value to identify the real time component health status parameters of the vehicle component.

According to a second broad aspect there is provided a system for identifying real time component health status parameters of a vehicle component. The system comprises a telematics hardware device comprising a processor, memory, firmware and communications capability; a remote device comprising a processor, memory, software and communications capability; the telematics hardware device monitoring at least one vehicle component from at least one vehicle and logging operational component data of the at least one vehicle component, the telematics hardware device communicating a log of operational component data to the remote device; the remote device accessing at least one record of operational component data, the operational component data comprising operational values from at least one vehicle component from at least one vehicle, the operational values representative of operational life cycle use of the at least one vehicle component, the operational values further based upon a measured component event, the remote device storing at least one threshold operational value representative of health of the vehicle component based upon the measured component event; and the remote device further associating the operational component data and the at least one threshold operational value to identify the real time component health status parameters of the vehicle component.

In an embodiment, the real time component health status parameters may be communicated to an owner of the vehicle.

In an embodiment the determining the at least one threshold operation value determines a minimum operational threshold value the measured component event representative of a failing health condition of the vehicle component to identify real time component health status parameters of the vehicle component.

In an embodiment, the operational data or real time component health status data may be filtered. In another embodiment, the operational values of the operational component data are filtered prior to the associating and the associating associates the filtered operational values of the operational component data and the at least one threshold operational value to identify the real time component health status parameters of the vehicle component. In another embodiment the filtering determines a moving average of one of the operational data and the real time component health status parameters which may comprise a filtered moving average of a predetermined number of most recent values of either of the operational data and the real time component health status parameters.

In an embodiment the associating standardizes the operational component data with the at least one threshold operational value to identify standardized real time component health status parameters of the vehicle component. In another embodiment the associating standardizes the operational component data with the minimum threshold operational value to identify standardizes real time component health status parameters of the vehicle component. In an embodiment, the standardized real time component health status parameters may be communicated to an owner of the vehicle. In another embodiment the standardized real time component health status parameters of the vehicle component are filtered. In another embodiment, the filtering determines a moving average of one of the operational data and the standardized real time component health status parameters.

In another embodiment, the method and system are applied to a plurality of vehicles in a fleet of vehicles to generate the standardized real time component health status parameters for the plurality of vehicles in the fleet, and the standardized real time component health status parameters are communicated to a fleet owner for the fleet of vehicles.

In an embodiment the determining the at least one threshold operation value determines a minimum operational threshold value (Xmin) representative of a failing health condition of the vehicle component and a maximum operational threshold value (Xmax) representative of an optimal health condition of the vehicle component, and the associating associates both the minimum and maximum threshold values with the operational values (X) of the operational component data to identify normalized real time component health status parameters of the vehicle component. In another embodiment the associating normalizes the operational values of the operational component data with the minimum threshold operational value and with the maximum threshold value to identify normalized real time component health status rating parameters where the normalized real time component health status parameters are one of a probability and numerical value representative of the probability. In another embodiment, the identified normalized real time component health status rating parameters of the vehicle component are filtered. In another embodiment, the filtering determines a moving average of one of the operational data and the normalized real time component health status rating parameters. In another embodiment, one of the operational component data and the identified normalized real time component health status rating parameters of the vehicle component are filtered by moving average of about the 100 most recent values of either of the operational component data and the identified normalized real time component health status rating parameters.

In another embodiment the minimum and maximum operational threshold values are determined from historical vehicle component data having a distribution curve associated with life cycle of the vehicle component from an optimal health condition to a failing health condition.

In an embodiment, each of the normalized real time component health status rating parameters (H) of the vehicle component may be derived from:

$$H=(X-X\text{min})/(X\text{max}-X\text{min}),$$

where X represents one of a filtered operational value and a non-filtered operational value and when X represents the non-filtered operational value, each of the normalized real time component health status rating parameters (H) is subsequently filtered.

In an embodiment there is provided determining of an intermediate threshold value based on the measured the measured component event and relative to or greater than the minimum threshold value, and triggering a component health pre-failure signal when the identified real time component health status parameters correspond to the intermediate threshold value. In another embodiment, the intermediate threshold value may be normalized relative to the minimum threshold value and trigger a component health pre-failure signal when the identified real time component health status parameters correspond with the normalized intermediate threshold value. In another embodiment the health pre-failure signal is communicated to an owner for the vehicle.

In an embodiment, the operational component data includes data representative of at least one category of fuel and air metering, emission control, ignition system control, vehicle idle speed control, transmission control, hybrid propulsion or battery.

In an embodiment, the operational component data includes data based upon at least one of on-board diagnostic fault codes, trouble codes, manufacturer codes, generic codes or vehicle specific codes.

In an embodiment, the operational values from at least one vehicle component include values representative of thermostat or temperature sensors, oil sensors, fuel sensors, coolant sensors, transmission fluid sensors, electric motor coolant sensors, battery, pressure sensors, oil pressure sensors, fuel pressure sensors, crankcase sensors, hydraulic sensors, fuel volume, fuel shut off, camshaft position sensors, crankshaft position sensors, O2 sensors, turbocharger sensors, waste gate sensors, air injection sensors, mass air flow sensors, throttle body sensors, air metering sensors, emission sensors, throttle position sensors, fuel delivery, fuel timing, system lean, system rich, injectors, cylinder timing, engine speed conditions, charge air cooler bypass, fuel pump sensors, intake air flow control, misfire indications, accelerometer sensors, knock sensors, glow plug sensors, exhaust gas recirculation sensors, air injection sensors, catalytic convertor sensors evaporative emission sensors, brake sensors, idle speed control sensors, throttle position, air conditioning sensors, power steering sensors, system voltages, engine control module values, starter motor voltage, starter motor current, torque converter sensors, fluid sensors, output shaft speed values, gear position, transfer box, converter status, interlock, torque values, hybrid battery pack values, cooling fan values and inverter and battery voltages In an embodiment the operational life cycle includes operational values from a new component to a failed component. In another embodiment, the operational life cycle includes a portion of operational values from a new component to a failed component.

In an embodiment, the measured component event is an event that provides a high operational load within the limits of the at least one vehicle component. In another embodiment, the measured component event is a cranking event for the at least one vehicle. In another embodiment, the cranking event is detected by sensing a voltage decrease over time followed by an indication of engine RPM. In another embodiment, the cranking event is detected by sensing a voltage decrease over time followed by an indication of vehicle speed. In an embodiment, a detected cranking event creates at least one record of operational component data in the form of a series of battery voltages. In an embodiment, the series of battery voltages include values indicative of ignition on, starter motor cranking, battery charging and battery recovery.

According to a third broad aspect there is provided a method for identifying real time health status rating parameters of an electrical system of a vehicle. The method comprises receiving a plurality of voltage signals indicating a change in voltage of a vehicle battery at times associated with a plurality of crankings of a starter motor of the vehicle; determining for each of the plurality of voltage signals a minimum voltage (V) of the voltage signal and generating a plurality of minimum voltage signals for a time period; determining a minimum operational threshold voltage value (Vmin) representative of a failing health condition of the electrical system during cranking of the starter motor and a maximum operational threshold voltage value (Vmax) representative of an optimal health condition of the electrical system during cranking of the starter motor; generating for each of the a plurality of minimum voltage signals normalized real time electrical system health status rating parameters based at least in part on normalization of the plurality of minimum voltage signals with the minimum and maximum operational threshold voltage values where the normalized real time component electrical system health status parameters are one of a probability and numerical value representative of the probability; and, communicating the normalized real time electrical system health status rating parameters to an owner of the vehicle.

According to a fourth broad aspect there is provided a system for identifying real time health status rating parameters of an electrical system of a vehicle. The system comprises a telematics hardware device comprising a processor, memory, firmware and communications capability, a remote device comprising a processor, memory, software and communications capability, the telematics hardware device monitoring at least one electrical system component from at least one vehicle and logging operational component data of the at least one electrical component, the telematics hardware device communicating a log of electrical system component data to the remote device; the remote device receiving a plurality of voltage signals indicating a change in voltage of a vehicle battery at times associated with a plurality of crankings of a starter motor of the vehicle; the remote device determining for each of the plurality of voltage signals a minimum voltage of the voltage signal (V) and generating a plurality of minimum voltage signals for a time period; the remote device storing a minimum operational threshold voltage value (Vmin) representative of a failing health condition of the electrical system during cranking of the starter motor and a maximum operational threshold voltage value (Vmax) representative of an optimal health condition of the electrical system during cranking of the starter motor; and, the remote device generating for each of the plurality of minimum voltage signals normalized real time electrical system health status rating parameters based at least in part on normalization of the plurality of minimum voltage signals with the minimum and maximum operational threshold voltage values where the normalized real time component electrical system health status parameters are one of a probability and numerical value representative of the probability; and, the remote device configured for communication of the normalized real time electrical system health status rating parameters to an owner of the vehicle.

In an embodiment, the numerical value representative of the probability is obtained by one of scaling, scaling and rounding, rounding, and percentage of the probability.

In an embodiment, a predetermined number of samples of the normalized real time electrical system health status rating parameters may be filtered in a moving average. In another embodiment, the moving average is for a predetermined number of samples of the plurality of minimum voltage signals. In an embodiment, the predetermined number of samples is in the order of 100 samples.

In an embodiment the normalized real time electrical system health status rating parameters are representative of at least one of a battery status, battery cable status, starter motor status and alternator status.

In an embodiment the normalized real time electrical system health status rating parameters (H) may be scaled by a factor of 100 to obtain the numerical value representative of probability.

In another embodiment, the method and system are applied to a plurality of vehicles in a fleet of vehicles to generate the normalized real time electrical system health status rating parameters for the plurality of vehicles in the fleet, and the normalized real time electrical system health status rating parameters are communicated to a fleet owner of the fleet of vehicles.

In another embodiment, the remote device stores an intermediate threshold voltage value associated with cranking of the starter motor that is greater than the minimum threshold value, triggering a component health pre-failure signal when one or more of said plurality of minimum voltage signals and the normalized real time component electrical system health status parameters is greater than with the intermediate threshold value; and communicating the component health pre-failure signal to an owner of the vehicle According to a fifth broad aspect there is provided a method for identifying real time health status parameters of an electrical system of a vehicle. The method comprises receiving a plurality of voltage signals indicating a change in voltage of a vehicle battery at times associated with a plurality of crankings of a starter motor of the vehicle; determining for each of the plurality of voltage signals a minimum voltage (V) of the voltage signal and generating a plurality of minimum voltage signals for a time period; determining a minimum operational threshold voltage value (Vmin) representative of a failing health condition of the electrical system during cranking of the starter motor; generating for each of the plurality of minimum voltage signals standardized real time electrical system health status parameters based at least in part on scaling of the plurality of minimum voltage signals with the minimum operational threshold voltage value; and, communicating the standardized real time electrical system health status rating parameters to an owner of the vehicle.

According to a sixth broad aspect there is provided a system for identifying real time health status parameters of an electrical system of a vehicle. The system comprises a telematics hardware device comprising a processor, memory, firmware and communications capability, a remote device comprising a processor, memory, software and communications capability, the telematics hardware device monitoring at least one electrical system component from at least one vehicle and logging operational component data of the at least one electrical component, the telematics hardware device communicating a log of electrical system component data to the remote device; the remote device receiving a plurality of voltage signals indicating a change in voltage of a vehicle battery at times associated with a plurality of crankings of a starter motor of the vehicle; the remote device determining for each of the plurality of voltage signals a minimum voltage of the voltage signal (V) and generating a plurality of minimum voltage signals for a time period; the remote device storing a minimum operational threshold voltage value (Vmin) representative of a failing health condition of the electrical system during cranking of the starter motor; the remote device generating for each of the plurality of minimum voltage signals standardized real time electrical system health status parameters based at least in part on scaling of the plurality of minimum voltage signals with the minimum operational threshold voltage value; and, the remote device communicating the standardized real time electrical health status rating parameters to an owner of the vehicle.

In an embodiment the standardized real time electrical system health status parameters are filtered. In another embodiment, the plurality of minimum voltage signals are filtered and generate the standardized real time electrical system health status parameters based at least in part of scaling of the filtered plurality of minimum voltage signals.

In an embodiment, there is determined an intermediate threshold voltage value during cranking of the starter motor that is greater than the minimum threshold value, triggering a component health pre-failure signal when one or more of said plurality of minimum voltage signals corresponds with the intermediate threshold value and communicating the component health pre-failure signal to the owner for the vehicle.

In an embodiment, the standardized real time electrical system health status parameters are representative of at least one of a battery status, battery cable status, starter motor status and alternator status.

In another embodiment, the method and system are applied to a plurality of vehicles in a fleet of vehicles to generate the standardized real time electrical system health status rating parameters for the plurality of vehicles in the fleet, and the standardized real time electrical system health status rating parameters are communicated to a fleet owner for the fleet of vehicles.

BRIEF DESCRIPTION OF THE DRAWINGS

Exemplary non-limiting embodiments are described with reference to the accompanying drawings in which:

FIG. 11b is a diagrammatic view of a distribution curve of real time health status parameters corresponding to the embodiment of vehicle data of FIG. 11a.

Figure 1:
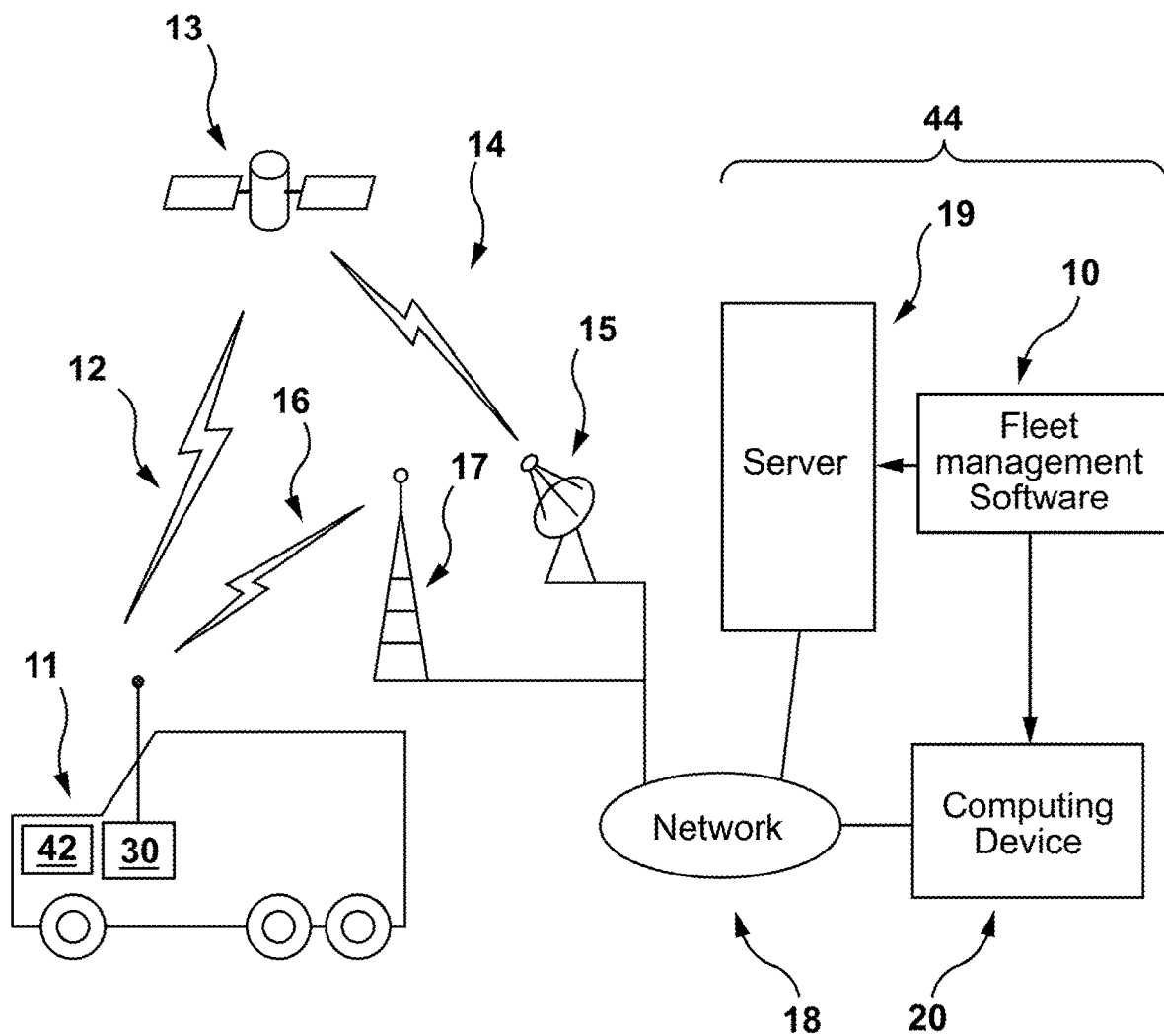
FIG. 1 is a high level diagrammatic view of a vehicular telemetry data environment and infrastructure.

The drawings are not necessarily to scale and are diagrammatic representations of the exemplary non-limiting embodiments of the present invention.

DETAILED DESCRIPTION

Described herein are techniques for monitoring operational components of vehicle, comprising electrical components and other components of a vehicle, to generate information on a state of an operational component over time and to generate a prediction of whether and/or when an operational component is likely to fail. In some embodiments, for each operational component that is monitored in this manner, one or more signals, generated by the operational component during an event that corresponds to a particular operation of the operational component, are monitored and characteristic values of the operational parameter(s) generated by the component during the event are determined (e.g., through statistical analysis of the signals to identify inflection points of the signals indicative of failing operation health of the component) and used in generating a real time component health indicator or parameter of the component as well as the prediction of whether and/or when the operational component is likely to fail. The prediction generated in this manner may be reliably used to determine whether and when to perform maintenance on a vehicle, to repair or replace the operational component before failure and to forecast demand for upcoming maintenance on the vehicle.

Such techniques for generating real time component health parameters and predictions of whether and/or when an operational component is likely to fail may be advantageous in some environments. Conventionally, there was no reliable way to predict when an operational component would fail. Manufacturers often publish information on their products, comprising "mean time between failure" (MTBF) information, that may indicate when the manufacturer expects a failure might occur. Unfortunately, this product information is wholly unreliable. Manufacturers tend to be very cautious in setting these product life estimates. This not only mitigates the risk of a product unexpectedly failing earlier than predicted, which may lead to a product owner suffering inconvenience from a product failure, but also encourages purchase of replacement products early, which may benefit the manufacturer as over time more products are purchased than otherwise would be. However, while early replacement benefits the manufacturer, early replacement is an unnecessary expense to a product owner. When a product owner owns hundreds or thousands of vehicles, over time, early and unnecessary replacement of parts can add up to a substantial cost, potentially millions of dollars, as compared to timely or just in time replacement.

Additionally, past approaches generated such product lifespan estimates using assumptions related to normal operation of a vehicle based upon a pre-established set of operating conditions, which may include operational criteria for a vehicle. In reality, vehicles are typically operated outside of such pre-established operating conditions such as, for example, a range of altitudes from sea-level to several thousand feet above sea-level, extreme cold temperatures, extreme hot temperatures, on highly rough roads causing significant vibration, and in mountainous terrains or flat terrains as well as other operational criteria. Vehicles may also be operated through four seasons that create four distinct operational environments. Operating a vehicle outside of normal operating conditions impacts the frequency and time between failures. Of course, few vehicles may have been operated perfectly within the assumptions that underlay the product lifespan estimates, undermining the reliability of the estimates for (or even making the estimates useless for, in some cases) real-world purposes.

Given the unreliability of manufacturer estimates, owners of such fleets of vehicles have therefore, conventionally, attempted to generate their own approximate predictions of failures of operational components, based primarily on time since an operational component was installed. Fleet owners are well aware, however, that this is also notoriously unreliable. Particularly when a fleet is used over a wide geographic area (e.g., a whole country), different vehicles in a fleet may encounter vastly different operating conditions, such as different environmental factors, road conditions, different operating styles that may yield different characteristics of vehicle operation (e.g., greater acceleration, greater speed, harder braking, more frequent engine turn offs and start-ups, etc.), different distances traveled, different loads carried, or other factors that influence operation of the vehicle. When there is significant variation in operating conditions, there may be significant variation in life span of operational components of a vehicle, comprising the operating conditions discussed in the preceding paragraph. Accordingly, while fleet owners may create a maintenance schedule for their vehicles to repair or replace operational components, such a schedule may not reliably predict failures in individual vehicles. Vehicles may therefore experience failures prior to a planned maintenance, which can significantly increase costs for fleet owners that may need to tow a vehicle to be repaired, repair the vehicle, make arrangements for transporting people and/or cargo that had been being transported by the failed vehicle, and accommodate schedule delays from the change in transportation of the people/cargo. These may be significant costs. As a result, as with manufacturer estimates, some fleet owners may replace operational components earlier than may be needed, which has its own substantial costs, as discussed above.

This lack of reliable real time component health status parameters of a vehicle being available to fleet owners and the lack of reliable prediction systems for failure or deterioration of vehicle operational components has presented difficulties to vehicle fleet operators for decades, and costs such fleet owners millions of dollars. The inventor has recognized and appreciated that there would be significant advantages for fleet owners if a reliable form of prediction could be offered.

The inventor recognized and appreciated the advantages that would be offered by a reliable prediction system that would monitor a vehicle and operational components of a vehicle in real time, during use of the vehicle, to generate a real time component health status parameter and a prediction specific to that vehicle and specific to that time. Such a system that generates a health status parameter and a prediction unique to each vehicle would have advantages over systems that generate information on average lifespans of products, given the significant inter-vehicle variation mentioned above, resulting from differences in operating conditions, comprising differences in operating environments. Moreover the inventor has recognized and appreciated that standardizing and or normalizing real time component health status parameters relative to vehicles in a vehicle class may make available to fleet owners standardized and or normalized fleet health data that is not vehicle class dependent. The inventor has further recognized and appreciated that normalization of fleet health data may be associated with component known lifespan to predict real time component remaining effective life.

The inventor has further recognized and appreciated that such an analysis may be conducted using data generated by vehicular telemetry systems of vehicles. Vehicular telemetry systems may include a hardware device to monitor and log a range of vehicle parameters, component parameters, system parameters and sub-system parameters in real time. An example of such a device is a Geotab® GO™ device available from Geotab, Inc. of Oakville, Ontario Canada (www.geotab.com). The Geotab® GO™ device interfaces to the vehicle through an on-board diagnostics (OBD) port to gain access to the vehicle network and engine control unit. Once interfaced and operational, the Geotab® GO™ device monitors the vehicle bus and creates of log of raw vehicle data. The Geotab® GO™ device may be further enhanced through an I/O expander (also available from Geotab, Inc.) to access and monitor other variables, sensors, devices, components, systems and subsystems resulting in a more complex and larger log of raw data. Additionally, the Geotab® GO™ device may further include a GPS capability for tracking and logging raw GPS data. The Geotab® GO™ device may also include an accelerometer for monitoring and logging raw accelerometer data. The Geotab® GO™ device may also include a capability to monitor atmospheric conductions such as temperature and altitude. The inventor thus recognized and appreciated that vehicle telemetry systems may collect types of data that, if combined with analysis techniques that analyze the data in a particular manner, could be used to generate a reliable prediction of whether and/or when an operational component will fail.

However, the inventor additionally recognized and appreciated that, when monitoring an operational component of a vehicle, that operational component may demonstrate significant variability in the signals generated by the operational component and that be monitored. Such variability presents an impediment to establishing clear analyses that could be used to determine whether a component is deteriorating or failing. For example, while an operational component under ideal operating conditions may, while failing, generate an operational parameter having a particular value, under non-ideal operating conditions that same component might produce an operational parameter that appears similar to that value associated with a failure, even when the operational component is not failing. Even for operational components that do not typically experience such a wide swing in values between conditions, the impact of variation in operating conditions introduces noise into a signal that substantially complicates analysis and prediction.

Generation of reliable real-time prediction and health status parameters is further complicated by effects of other operational components of the vehicle on a monitored operational component. In some events in which an operational component may be used, the operational component may interact with one or more other operational components of the vehicle. The failure or deterioration of these other operational components may affect operational parameters generated by the operational component being monitored. This impact could cause signals to be generated by the monitored operational component that appear as if the operational component is deteriorating or failing, even in the case that the operational component is not deteriorating or failing. Similarly, deterioration or failure of an operational component could be masked by its interaction with other operational components, or it may be difficult to determine which operational component is deteriorating or failing.

The inventor has thus recognized and appreciated that, in some embodiments, monitoring operating conditions of an operational component may aid in generating a reliable prediction of whether and/or when an operational component will fail, or aid in increasing reliability of such a prediction. Such operating conditions may include environmental conditions, such as conditions in which a vehicle is being operated, including climate or weather conditions (temperature, humidity, altitude, etc.), characteristics of vehicle operation (e.g., characteristics of acceleration, speed, braking, etc.), distance traveled, loads carried, road conditions, or other factors that influence operation of the vehicle. Operating conditions of an operational component may additionally or alternatively include information on other operational components of the vehicle, or of maintenance performed on operational components. Signals generated by an operational component may be contextualized by that operating condition information. The contextualization may aid in generating reliable predictions of deterioration or failure, such as by eliminating potential noise or environment-triggered variation in operational parameters.

Variation in operation signals may additionally be accounted for, or mitigated, in some embodiments by monitoring operational components through generation of statistical values that characterize operational parameters generated by an operational component over time. Such statistical values may characterize an operational parameter in various ways, including describing a maximum value of a signal over a time period, a minimum value of a signal over a time period, an average value of a signal over a time period, a change in a signal over a time period, a variance of a signal over a time period, one or more operational thresholds of a signal over a time period or other value that may be calculated or identified from a statistical analysis of an operational parameter over time. Different time periods may be used for calculating different statistical values. For example, some statistical values may be calculated from an analysis of values of an operational parameter generated during a time period corresponding to one or more events in which the operational component performed an action, or interacted with other operational components of the vehicle to collectively perform an action.

The inventor has further recognized and appreciated that additional complexity may be introduced into monitoring of an operation component by the number of different operational parameters that may be generated by an operational component, and the number of statistical analyses that can be performed on these different operational parameters over time. As mentioned in the preceding paragraph, in some embodiments, operational parameters generated by an operational component specific to an event may be monitored and used to generate statistical values. Such an event may correspond to an action performed by one or more operational components of the vehicle. Over time, some operational components may perform multiple different actions, and thus there may be a large number of events that could be monitored. An operational component may engage in each action in a different way, or each action may have a different impact on an operational component. As a result, different operational parameters may be generated. Moreover, when different operational parameters are generated, there may be different characteristics of the operational parameter that would be associated with proper operation, deterioration, or failure of the operational component. These different characteristics may be reflected in different statistical analyses. Accordingly, identifying, even for one operational component, a manner in which to analyze operational parameters to predict whether and/or when the operational component may fail is complex.

The inventor has recognized and appreciated that by monitoring a large group of vehicles, with the same or similar operation components, over time, in different operating conditions, and collecting different operation signals over time, may enable selection of one or more particular events to monitor for an operational component, and particular statistical analyses to perform of operational parameters generated during the event(s). Operational parameters collected for operation components of the large group of vehicles may be analyzed, together with information on events that occurred at times the operation signals were generated, to determine events and changes in operational parameters that are correlated with deterioration or failure of an operational component. For example, events and changes in operational parameters that are correlated to the health status of an operational component during its operational life may be determined from the analysis. Based on identified correlations, one or more events to monitor and one or more statistical analysis to perform on operational parameters generated during the event(s) may be determined. By identifying the event(s) and statistical analysis(es), a prediction process may be created based on the event(s) and the statistical analysis(es) that leverages the correlation and can generate a prediction of a health condition of an operation component when operational parameters from such an event are detected. More particularly, for example, when a statistical analysis of operational parameters from an event satisfy one or more conditions that, based on the analysis of the operational parameters for the large group of vehicles, is correlated with a deterioration of an operational component, the prediction process may determine that the operational component is deteriorating. As another example, when a statistical analysis of operational parameters from an event satisfy one or more conditions that, based on the analysis of the operational parameters for the large group of vehicles, is correlated with a failure of an operational component at the event and/or is correlated with optimal performance of the operational component at the event, the prediction process may determine the health of operational component.

Accordingly, described herein are techniques for collecting and analyzing one or more operational parameters generated by one or more operational components during an event, and based on an analysis of the one or more operational parameters, generating a prediction of the real time health of a particular operational component and/or a prediction of whether and/or when a particular operational component will deteriorate or fail. Some techniques described herein may be used to determine, from an analysis of the operational parameters, a current health status of an operational component, which may characterize how current operation of the operational component compares to operation of the operational component when failing (e.g., whether the operational component has reached or is about to reach a failing health condition at which the component fails to provide reliable operation).

In some such embodiments, operational parameters generated by a first operational component for which a prediction is generated may be contextualized in the analysis with other information. Such other information may include operational parameters generated by one or more other operational components at a time (e.g., during an event) that the operational parameters of the first operational component were generated. Such other information may additionally or alternatively include information on operating conditions of the vehicle. Such other information may additionally or alternatively include information on a maintenance schedule of a vehicle and/or an operational component, such as past completed maintenance (including repair or replacement) and planned future maintenance.

In some embodiments, the vehicle may be a truck and the operational component may be a battery. Clearly, a battery is used over a long period of time and in connection with a large number of events. Operational parameters may be generated by the battery throughout this time, and corresponding to any one of the large number of events. Additionally, a large number of different statistical analyses could be performed on these operational parameters. The inventor recognized and appreciated, however, that operational parameters generated during a particular type of event may be useful in generating a prediction of whether the battery is deteriorating, failing or when the battery will fail. The inventor further recognized and appreciated that a prediction of whether a battery is deteriorating, failing or about to fail may be symptomatic of other electrical system deterioration or failures related to, as example, battery cables, the starter motor and/or the alternator. Moreover, the inventor recognized and appreciated that analyzing such operational parameters in the context of particular statistical analyses to ascertain one or more event threshold operational values for the battery together with an analysis of the real time operational event parameters would yield reliable health status information on the battery that may be useful in predicting whether and/or when the battery will deteriorate or fail. The inventor further recognized and appreciated that standardization and/or normalization of such operational event parameters in the context of one or more threshold operational values provides a health status rating for specific vehicles that fleet owners may apply uniformly across vehicles of the same vehicle class or different vehicle classes. Moreover, the inventor recognized and appreciated that normalization of such operational event parameters with new and failing threshold values when associated with component life span data provides a remaining effective life valuation upon which fleet owners may predict time lines for component replacement and may allow fleet owners to budget both time and costs associated with component replacement.

In particular, the inventor recognized and appreciated that a starter motor event generates operational parameters that may be advantageously used in determining a status of a battery, and that evaluating minimum voltages during starter motor events over time, may be advantageous in generating a reliable prediction of whether and/or when the battery will fail. The inventor also recognized and appreciated that other components and parameters in association with the starter motor event may be beneficial to determining the status of a battery such as air temperature, oil temperature, coolant temperature, road conditions (vibrations detected by an accelerometer) and altitudes.

During a starter motor event, the starter motor will draw energy from the battery. An operational parameter may be generated by the battery, or by a sensor that operates with the battery, that indicates a voltage of the battery over a time corresponding to the event. The event may last from a time that energy starts being drawn from the battery for the starter motor through a time that the engine of the vehicle has been successfully started and an alternator is supplying electrical energy to the battery. Over this time, the voltage of the battery may drop before rising again once the battery is being charged by the alternator. The operational parameters for this event may indicate a voltage of the battery over time, demonstrating the drop and then rise in voltage. A statistical analysis may be performed for a starter motor event to identify a maximum and minimum value of the voltage during the starter motor event. Alternatively, a statistical analysis may be performed for multiple starter motor events to calculate, over a period of time (e.g., a number of starter motor events), minimum voltages from individual starter motor events.

From this statistical analysis, the inventor recognized and appreciated that focusing on the minimum value of battery voltages during respective cranking events are key health predictive parameters for the batteries when under load. A statistical analysis may be performed of these key health predictive parameters on a real time basis to determine a distribution curve of battery voltages for the same class of vehicles in a fleet during and under load of the cranking events. From the distribution curve or histogram of minimum value of battery voltages during load cranking events, the inventor recognized and appreciated that minimum and maximum operational threshold voltage values of battery voltage may be identified respectively representing a failing health condition (for example, a battery no longer reliable to provide sufficient voltage to enable start-up of the vehicle) and an optimal health condition (for example a new battery) for batteries in the same class of vehicles in the fleet. Moreover, an analysis of the minimum value of battery voltages during cranking events for each battery when associated with one or more of the minimum and maximum operational threshold voltage values may be used to identify a the real time battery health condition independent of battery and/or vehicle class. The health condition of the battery may be useful in generating a prediction of whether and/or when the battery may fail and result in a maintenance work order being sent to the fleet owner, and may also identify remaining lifespans of batteries from which the owner may forecast battery replacement costs and vehicle maintenance. The inventor recognized and appreciated that standardizing real time health status battery parameters relative to the minimum operational threshold voltage value to have a mean of zero provides an inflection point common to all vehicles in the owner's fleet regardless of the class of the vehicle providing a standardized battery parameter corresponding to a failing or about to fail battery operating condition. The inventor further recognized and appreciated that normalizing real time health status battery parameters relative to the minimum operational threshold voltage value and the maximum operation health value provides a health status rating for each battery of vehicles in the fleet that fleet owners can apply uniformly across vehicles of the same vehicle class or different vehicle classes. The inventor recognized and realized that this normalization of the health status rating may be represented and communicated to a fleet owner as a probability or a numerical representation of that probability such as, for example, one or more of scaling, rounding, and as a percentage. The inventor recognized and appreciated that statistical normalization of the real time health of battery parameters of batteries in a fleet of vehicles provides a health probability that can be associated with an expected life span of the battery thereby providing real time remaining life span information for each battery in the fleet of vehicles.

It should be appreciated that embodiments described herein may be used in connection with any of a variety of vehicles and operational components of a vehicle. Embodiments are not limited to operating in connection with any particular operational component, any particular type of operational component, or any particular type of vehicle. Accordingly, while an example was given above of how the system may be used in connection with an operational component that is a battery of a truck, and that example is used occasionally below to illustrate how a particular technique may be implemented in some embodiments, it should be appreciated that the example is merely illustrative and that other embodiments may operate with other operational components or other vehicles. Accordingly, while specific examples of embodiments are described below in connection with FIGS. 1-16, it should be appreciated that embodiments are not limited to operating in accordance with the examples and that other embodiments are possible.

Vehicular Telemetry Environment & Raw Data Logging

Referring to FIG. 1 of the drawings, there is illustrated one embodiment of a high level overview of a vehicular telemetry environment and infrastructure. There is at least one mobile device or vehicle generally indicated at 11. The vehicle 11 includes a vehicular telemetry hardware system 30 and a resident vehicular portion 42. Optionally connected to the telemetry hardware system 30 is at least one intelligent I/O expander 50 (not shown in FIG. 1—see FIG. 2b). In addition, there may be at least one wireless communication module such as Bluetooth® wireless communication module 45 (not shown in FIG. 1—See FIG. 2d) for communication with at least one of the vehicular telemetry hardware system 30 or the intelligent I/O expander 50.

The vehicular telemetry hardware system 30 monitors and logs a first category of raw telematics data known as vehicle data. The vehicular telemetry hardware system 30 may also log a second category of raw telematics data known as GPS coordinate data and may also log a third category of raw telematics data known as accelerometer data.

The intelligent I/O expander 50 may also monitor a fourth category of raw expander data. A fourth category of raw data may also be provided to the vehicular telemetry hardware system 30 for logging as raw telematics data.

Figure 2A:
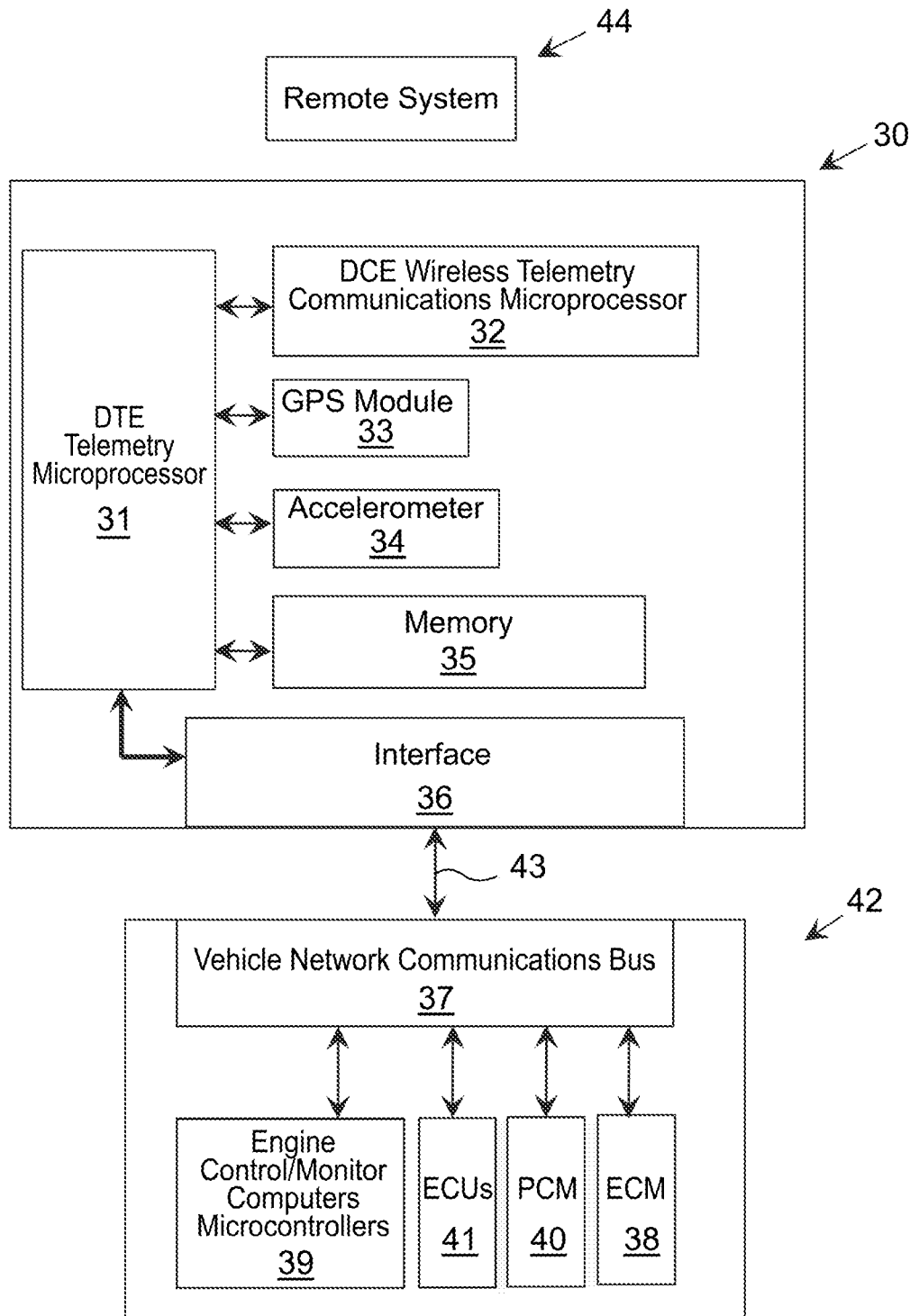
FIG. 2a is a diagrammatic view of a vehicular telemetry hardware system comprising an on-board portion and a resident vehicular portion.
Figure 2B:
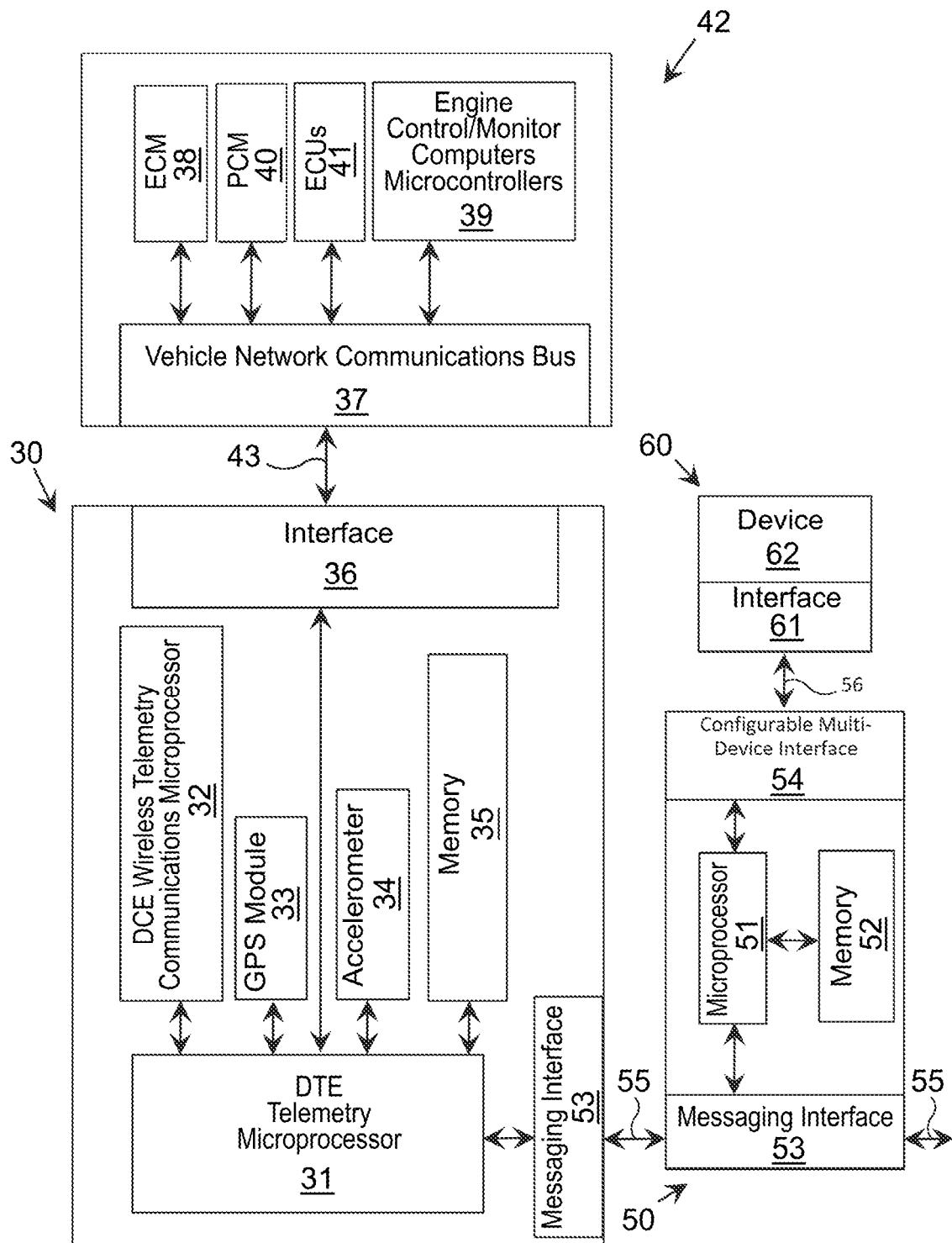
FIG. 2b is a diagrammatic view of a vehicular telemetry hardware system communicating with at least one intelligent I/O expander.
Figure 2C:
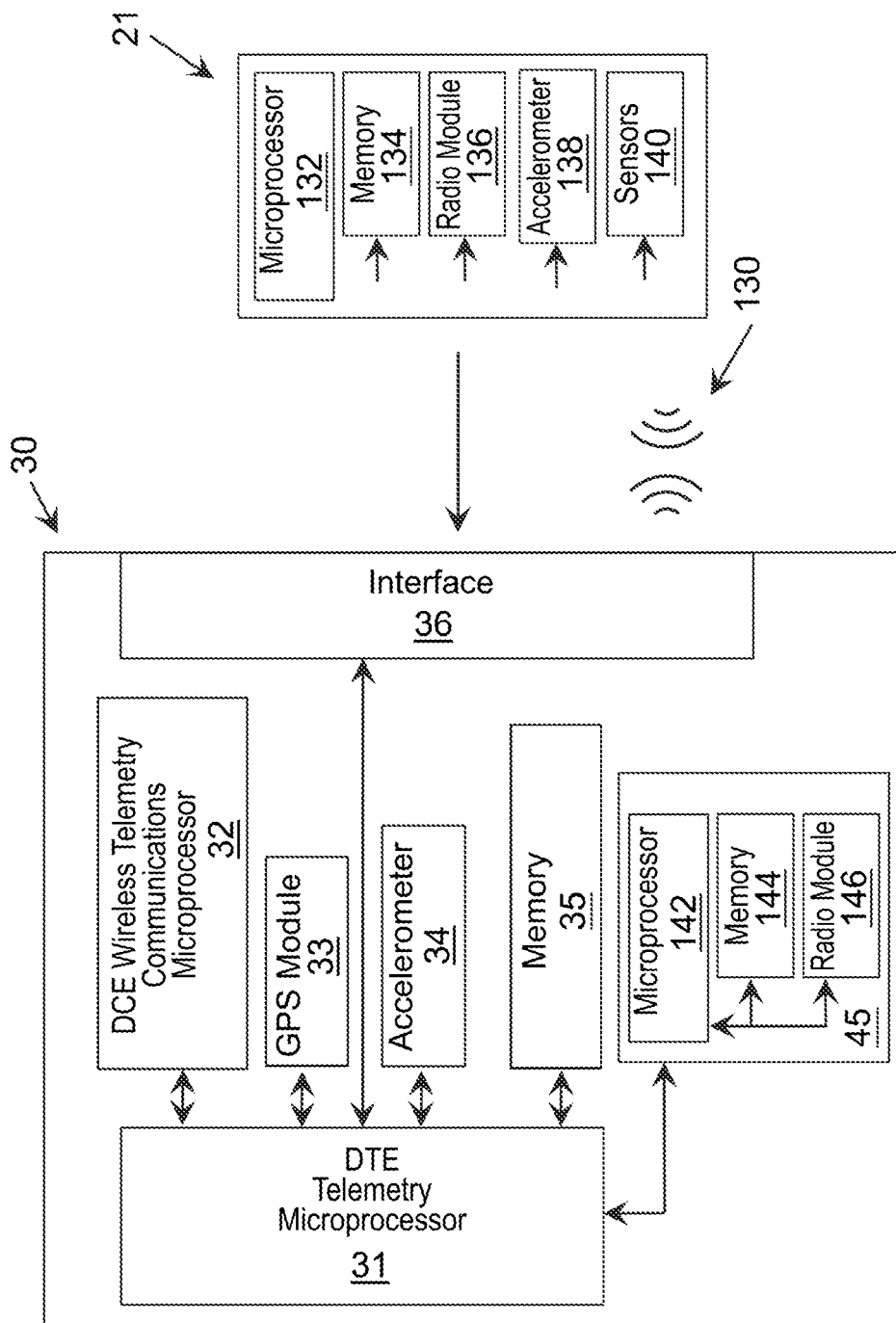
FIG. 2c is a diagrammatic view of a vehicular telemetry hardware system with an integral wireless communication module capable of communication with at least one beacon module.
Figure 2D:
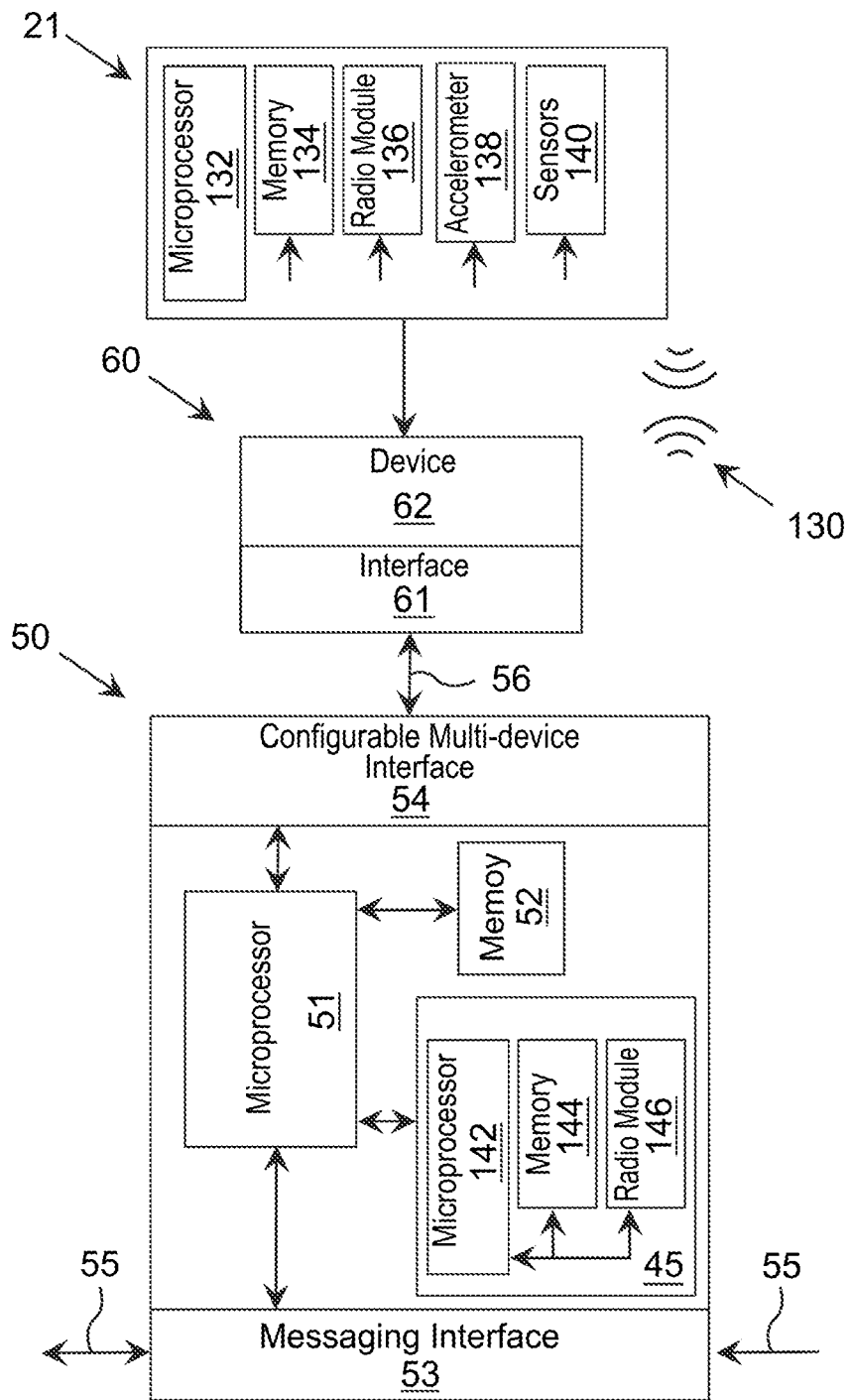
FIG. 2d is a diagrammatic view of at least one intelligent I/O expander with an integral wireless communication module capable of communication with at least one beacon module.

The Bluetooth® wireless communication module 45 may also be in periodic communication with at least one beacon such as Bluetooth® wireless communication beacon 21 (not shown in FIG. 1—see FIG. 2d). The at least one Bluetooth® wireless communication beacon may be attached or affixed or associated with at least one object associated with the vehicle 11 to provide a range of indications concerning the objects. These objects include, but are not limited to packages, equipment, drivers and support personnel. The Bluetooth® wireless communication module 45 provides this fifth category of raw object data to the vehicular telemetry hardware system 30 either directly or indirectly through an intelligent I/O expander 50 for subsequent logging as raw telematics data.

Persons skilled in the art appreciate the five categories of data are illustrative and only one or a suitable combination of categories of data or additional categories of data may be provided. In this context, a category of raw telematics data is a grouping or classification of a type of similar data. A category may be a complete set of raw telematics data or a subset of the raw telematics data. For example, GPS coordinate data is a group or type of similar data. Accelerometer data is another group or type of similar data. A log may include both GPS coordinate data and accelerometer data or a log may be separate data. Persons skilled in the art also appreciate the makeup, format and variety of each log of raw telematics data in each of the categories is complex and significantly different. The amount of data in each of the categories is also significantly different and the frequency and timing for communicating the data may vary greatly. Persons skilled in the art further appreciate the monitoring, logging and the communication of multiple logs or raw telematics data results in the creation of raw telematics big data.

The vehicular telemetry environment and infrastructure also provides communication and exchange of raw telematics data, information, commands, and messages between the at least one server 19, at least one computing device 20 (remote devices such as desktop computers, hand held device computers, smart phone computers, tablet computers, notebook computers, wearable devices and other computing devices), and vehicles 11. In one example, the communication 12 is to/from a satellite 13. The satellite 13 in turn communicates with a ground-based system 15 connected to a computer network 18. In another example, the communication 16 is to/from a cellular network 17 connected to the computer network 18. Further examples of communication devices include Wi-Fi® wireless communication devices and Bluetooth® wireless communication devices connected to the computer network 18.

Computing device 20 and server 19 with corresponding application software communicate over the computer network 18 may be provided. In an embodiment, the myGeotab™ fleet management application software 10 runs on a server 19. The application software may also be based upon Cloud computing. Clients operating a computing device 20 communicate with the myGeotab™ fleet management application software running on the server 19. Data, information, messages and commands may be sent and received over the communication environment and infrastructure between the vehicular telemetry hardware system 30 and the server 19.

Data and information may be sent from the vehicular telemetry hardware system 30 to the cellular network 17, to the computer network 18, and to the at least one server 19. Computing devices 20 may access the data and information on the servers 19. Alternatively, data, information, and commands may be sent from the at least one server 19, to the network 18, to the cellular network 17, and to the vehicular telemetry hardware system 30.

Data and information may also be sent from vehicular telemetry hardware system to an intelligent I/O expander 50, to a satellite communication device such as an Iridium® satellite communication device available from Iridium Communications Inc. of McLean, Va., USA, the satellite 13, the ground based station 15, the computer network 18, and to the at least one server 19. Computing devices 20 may access data and information on the servers 19. Data, information, and commands may also be sent from the at least one server 19, to the computer network 18, the ground based station 15, the satellite 13, the satellite communication device, to an intelligent I/O expander 50, and to a vehicular telemetry hardware system.

The methods or processes described herein may be executed by the vehicular telemetry hardware system 30, the server 19 or any of the computing devices 20. The methods or processes may also be executed in part by different combinations of the vehicular telemetry hardware system 30, the server 19 or any of the computing devices 20.

Vehicular Telemetry Hardware System Overview

Referring now to FIG. 2a of the drawings, there is illustrated a vehicular telemetry hardware system generally indicated at 30. The on-board portion generally includes: a DTE (data terminal equipment) telemetry microprocessor 31; a DCE (data communications equipment) wireless telemetry communications microprocessor 32; a GPS (global positioning system) module 33; an accelerometer 34; a non-volatile memory 35; and provision for an OBD (on board diagnostics) interface 36 for communication 43 with a vehicle network communications bus 37.

The resident vehicular portion 42 generally includes: the vehicle network communications bus 37; the ECM (electronic control module) 38; the PCM (power train control module) 40; the ECUs (electronic control units) 41; and other engine control/monitor computers and microcontrollers 39.

While the system is described as having an on-board portion 30 and a resident vehicular portion 42, it is also understood that this could be either a complete resident vehicular system or a complete on-board system.

The DTE telemetry microprocessor 31 is interconnected with the OBD interface 36 for communication with the vehicle network communications bus 37. The vehicle network communications bus 37 in turn connects for communication with the ECM 38, the engine control/monitor computers and microcontrollers 39, the PCM 40, and the ECU 41.

The DTE telemetry microprocessor 31 has the ability through the OBD interface 36 when connected to the vehicle network communications bus 37 to monitor and receive vehicle data and information from the resident vehicular system components for further processing.

As a brief non-limiting example of a first category of raw telematics vehicle data and information, the list may include one or more of but is not limited to: a VIN (vehicle identification number), current odometer reading, current speed, engine RPM, battery voltage, cranking event data, engine coolant temperature, engine coolant level, accelerator pedal position, brake pedal position, various manufacturer specific vehicle DTCs (diagnostic trouble codes), tire pressure, oil level, airbag status, seatbelt indication, emission control data, engine temperature, intake manifold pressure, transmission data, braking information, mass air flow indications and fuel level. It is further understood that the amount and type of raw vehicle data and information will change from manufacturer to manufacturer and evolve with the introduction of additional vehicular technology.

Continuing now with the DTE telemetry microprocessor 31, it is further interconnected for communication with the DCE wireless telemetry communications microprocessor 32. In an embodiment, an example of the DCE wireless telemetry communications microprocessor 32 is a Leon 100™ which is commercially available from u-blox Corporation of Thalwil, Switzerland (www.u-blox.com). The Leon 100™ wireless telemetry communications microprocessor provides mobile communications capability and functionality to the vehicular telemetry hardware system 30 for sending and receiving data to/from a remote site 44. A remote site 44 could be another vehicle or a ground based station. The ground-based station may include one or more servers 19 connected through a computer network 18 (see FIG. 1). In addition, the ground-based station may include computer application software for data acquisition, analysis, and sending/receiving commands to/from the vehicular telemetry hardware system 30.

The DTE telemetry microprocessor 31 is also interconnected for communication to the GPS module 33. In an embodiment, an example of the GPS module 33 is a Neo-5™ also commercially available from u-blox Corporation. The Neo-5™ provides GPS receiver capability and functionality to the vehicular telemetry hardware system 30. The GPS module 33 provides the latitude and longitude coordinates as a second category of raw telematics data and information.

The DTE telemetry microprocessor 31 is further interconnected with an external non-volatile memory 35. In an embodiment, an example of the memory 35 is a 32 MB non-volatile memory store commercially available from Atmel Corporation of San Jose, Calif., USA. The memory 35 is used for logging raw data.

The DTE telemetry microprocessor 31 is further interconnected for communication with an accelerometer 34. An accelerometer (34) is a device that measures the physical acceleration experienced by an object. Single and multi-axis models of accelerometers are available to detect the magnitude and direction of the acceleration, or g-force, and the device may also be used to sense orientation, coordinate acceleration, vibration, shock, and falling. The accelerometer 34 provides this data and information as a third category of raw telematics data.

In an embodiment, an example of a multi-axis accelerometer (34) is the LIS302DL™ MEMS Motion Sensor commercially available from STMicroelectronics of Geneva, Switzerland. The LIS302DL™ integrated circuit is an ultra compact low-power three axes linear accelerometer that includes a sensing element and an IC interface able to take the information from the sensing element and to provide the measured acceleration data to other devices, such as a DTE Telemetry Microprocessor (31), through an I2C/SPI (Inter-Integrated Circuit) (Serial Peripheral Interface) serial interface. The LIS302DL™ integrated circuit has a user-selectable full-scale range of +−2 g and +−8 g, programmable thresholds, and is capable of measuring accelerations with an output data rate of 100 Hz or 400 Hz.

In an embodiment, the DTE telemetry microprocessor 31 also includes an amount of internal memory for storing firmware that executes in part, methods to operate and control the overall vehicular telemetry hardware system 30. In addition, the microprocessor 31 and firmware log data, format messages, receive messages, and convert or reformat messages. In an embodiment, an example of a DTE telemetry microprocessor 31 is a PIC24H™ microcontroller commercially available from Microchip Technology Inc. of Westborough, Mass., USA.

Referring now to FIG. 2b of the drawings, there is illustrated a vehicular telemetry hardware system generally indicated at 30 further communicating with at least one intelligent I/O expander 50. In this embodiment, the vehicular telemetry hardware system 30 includes a messaging interface 53. The messaging interface 53 is connected to the DTE telemetry microprocessor 31. In addition, a messaging interface 53 in an intelligent I/O expander 50 may be connected by the private bus 55. The private bus 55 permits messages to be sent and received between the vehicular telemetry hardware system 30 and the intelligent I/O expander, or a plurality of I/O expanders (not shown). The intelligent I/O expander hardware system 50 also includes a microprocessor 51 and memory 52. Alternatively, the intelligent I/O expander hardware system 50 includes a microcontroller 51. A microcontroller includes a CPU, RAM, ROM and peripherals. Persons skilled in the art appreciate the term processor contemplates either a microprocessor and memory or a microcontroller in all embodiments of the disclosed hardware (vehicle telemetry hardware system 30, intelligent I/O expander hardware system 50, wireless communication module 45 (FIG. 2c) and wireless communication beacon 21 (FIG. 2c)). The microprocessor 51 is also connected to the messaging interface 53 and the configurable multi-device interface 54. In an embodiment, a microcontroller 51 is an LPC1756™ 32 bit ARM Cortec-M3 device with up to 512 KB of program memory and 64 KB SRAM, available from NXP Semiconductors Netherlands B. V., Eindhoven, The Netherlands. The LPC1756™ also includes four UARTs, two CAN 2.0B channels, a 12-bit analog to digital converter, and a 10 bit digital to analog converter. In an alternative embodiment, the intelligent I/O expander hardware system 50 may include text to speech hardware and associated firmware (not illustrated) for audio output of a message to an operator of a vehicle 11.

The microprocessor 51 and memory 52 cooperate to monitor at least one device 60 (a device 62 and interface 61) communicating with the intelligent I/O expander 50 over the configurable multi device interface 54 through bus 56. Data and information from the device 60 may be provided over the messaging interface 53 to the vehicular telemetry hardware system 30 where the data and information is retained in the log of raw telematics data. Data and information from a device 60 associated with an intelligent I/O expander provides the $4^{th}$ category of raw expander data and may include, but not limited to, traffic data, hours of service data, near field communication data such as driver identification, vehicle sensor data (distance, time), amount and/or type of material (solid, liquid), truck scale weight data, driver distraction data, remote worker data, school bus warning lights, and doors open/closed.

Figure 2E:
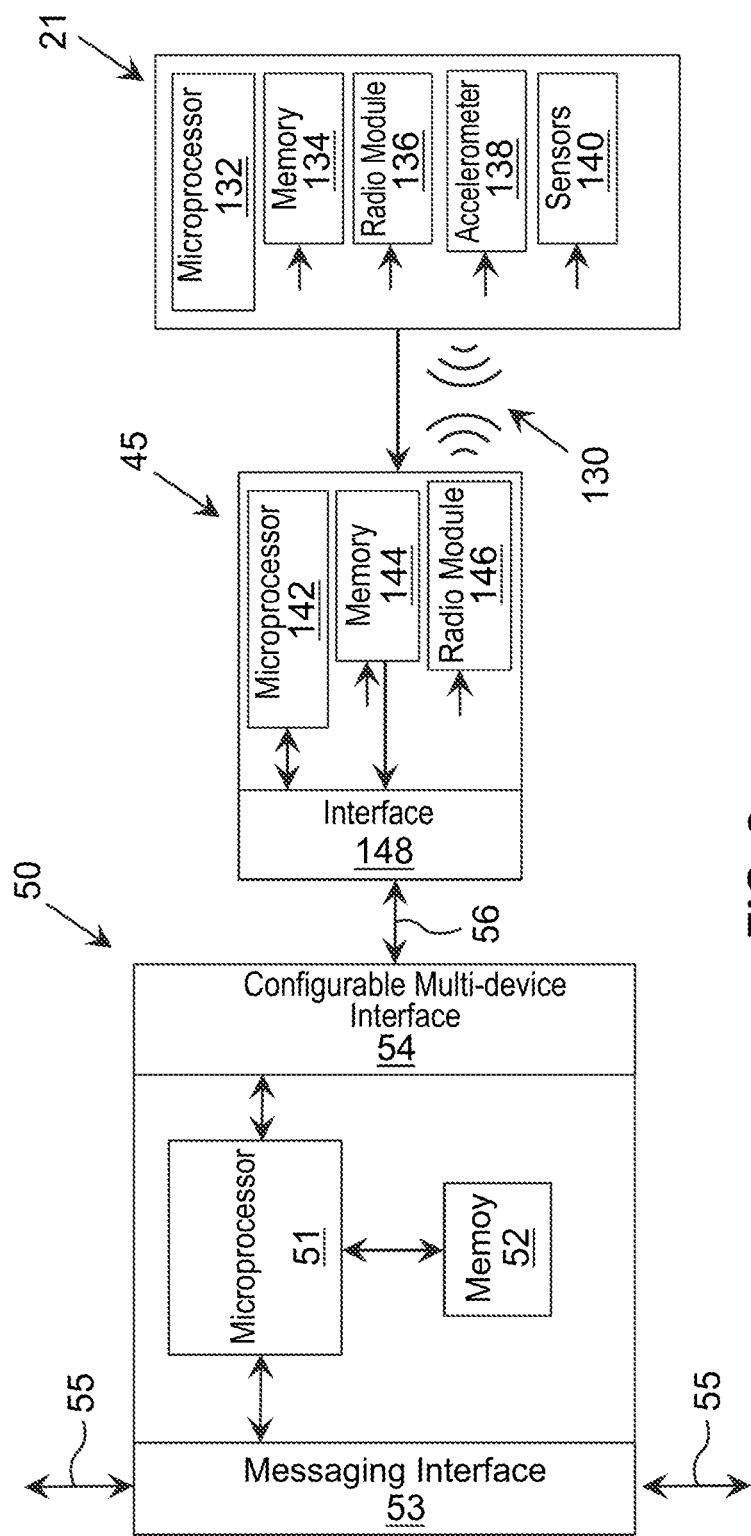
FIG. 2e is a diagrammatic view of an intelligent I/O expander and device capable of communication with at least one beacon module.

Referring now to FIGS. 2c, 2d and 2e, there are three alternative embodiments relating to the Bluetooth® wireless communication module 45 and Bluetooth® wireless communication beacon 21 for monitoring and receiving the 5th category of raw beacon data. The module 45 includes a microprocessor 142, memory 144 and radio module 146. The microprocessor 142, memory 144 and associated firmware provide monitoring of beacon data and information and subsequent communication of the beacon data, either directly or indirectly through an intelligent I/O expander 50, to a vehicular telemetry hardware system 30.

In an embodiment, the module 45 is integral with the vehicular telemetry hardware system 30. Data and information is communicated 130 directly from the beacon 21 to the vehicular telemetry hardware system 30. In an alternate embodiment, the module 45 is integral with the intelligent I/O expander. Data and information is communicated 130 directly to the intelligent I/O expander 50 and then through the messaging interface 53 to the vehicular telemetry hardware system 30. In another alternate embodiment, the module 45 includes an interface 148 for communication 56 to the configurable multi-device interface 54 of the intelligent I/O expander 50. Data and information is communicated 130 directly to the module 45, then communicated 56 to the intelligent I/O expander and finally communicated 55 to the vehicular telemetry hardware system 30.

Data and information from a beacon 21, such as the Bluetooth® wireless communication beacon provides the 5th category of raw telematics data and may include data and information concerning an object associated with the beacon 21. In one embodiment, the beacon 21 is attached to the object. This data and information includes, but is not limited to, object acceleration data, object temperature data, battery level data, object pressure data, object luminance data and user defined object sensor data. This 5th category of data may be used to indicate, among others, damage to an article or a hazardous condition to an article.

Telematics Predictive Component Health Rating

Aspects disclosed herein relate to monitoring and optimally predicting health, replacement or maintenance of a vehicle component before failure of the component. Aspects disclosed herein relate to monitoring and optimally predicting health, replacement or maintenance of a vehicle component before failure of the component and providing standardized health status parameters and/or normalized health status rating parameters which may be understood across vehicles of differing characteristics. Aspects disclosed herein also relate to monitoring and predicting replacement of an electrical or electronic vehicle component before failure of the electrical component, or providing a real time electrical system health rating parameter. By way of an example only, the vehicle component may be a vehicle battery.

Figure 3:
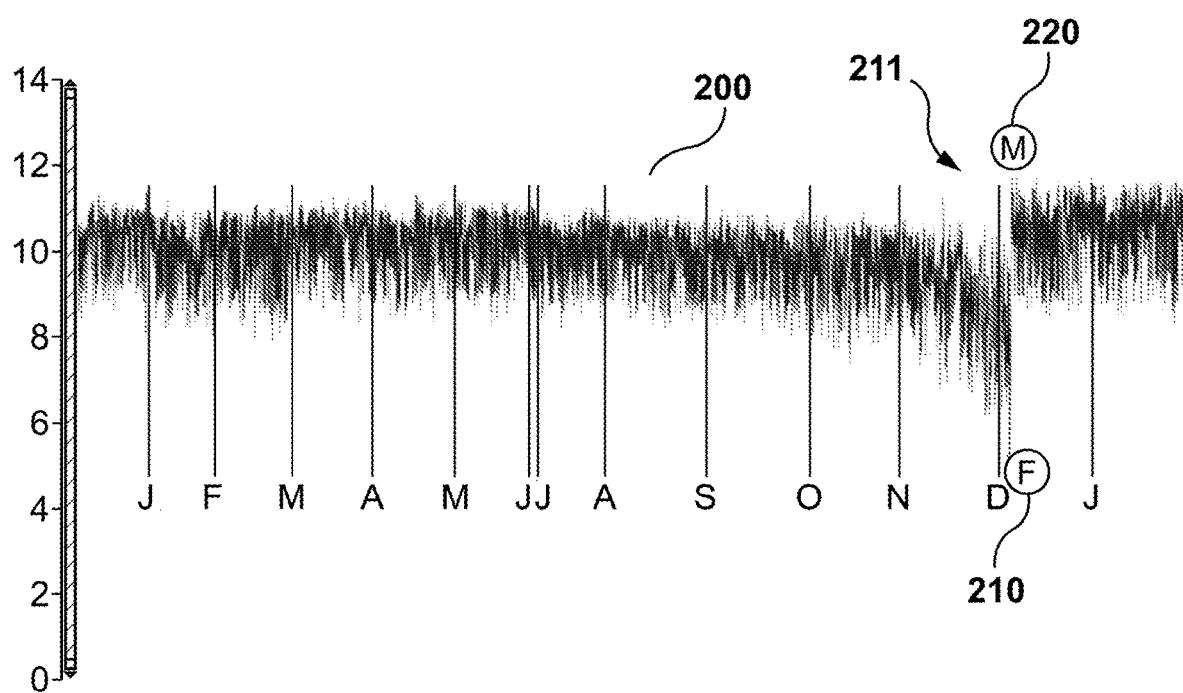
FIG. 3 is a diagrammatic view of raw vehicle component data over a period of time illustrating raw data representative of the vehicle component useful life correlated with an event such as vehicle component failure or vehicle component maintenance.

FIG. 3 illustrates a historical sample of raw big telematics data 200 over about a 14 month period of time for one vehicle. The sample is based upon a collection of multiple logs of data from the vehicular telemetry hardware system 30. The sample pertains to the use of a vehicle component over the useful life, or life span, of the vehicle component from a new installation, normal use, failure and replacement. The raw big telematics data 200 reveals operational parameters around the process of vehicle component use and failure over several months of useful life. The raw big telematics data, or historical records of data, is obtained from at least one telematics hardware system in the form of a log of data that is communicated to a remote site. The operational values are further based upon a measured component event.

The y-axis is values of operational parameters for a vehicle component based upon a type of vehicle component event 211. For example, the y-axis may be operational parameters for a vehicle battery during a starter motor cranking event where electrical energy is supplied by the vehicle battery to start an engine and then electrical energy is provided back to the vehicle battery to replenish the energy used by the starter motor cranking event (see FIG. 4 and FIG. 5). The x-axis is values relating to time over the life cycle of the vehicle component, for example days, months and years. In an embodiment, the raw big telematics data 200 illustrates the maximum and minimum values for vehicle component battery voltages for numerous starter motor cranking events. The raw big telematics data 200 has two distinct patterns or trends on either side of a vehicle component event 211 where this event may be either one of a failure event 210 or a maintenance event 220 with respect to the vehicle component. The pattern post a vehicle component event 211 is a smaller or narrower variation of values on the y-axis and the magnitude of the values is greater.

The operational parameters evolve over time from a new vehicle component state to a failed vehicle component state wherein the magnitude of the operational parameters decreases over time and the variance increases over time until failure and installation of a new vehicle component. However, this embodiment concerns changes in magnitude of the operational parameters at the measurable component event. A few representative examples of operational components are vehicle batteries, starter motors, O2 sensors, temperature sensors and fluid sensors. Over continued use of the vehicle component, the operational parameters will change or evolve where the raw big telematics data 200 will decrease in magnitude. For an embodiment, the magnitude is a minimum battery voltage level based upon a vehicle component starter motor cranking event and the average minimal battery cranking voltage decreases over time and operational useful life. The vehicle component cranking event is an example of a measurable component event and an example of a maximum or significant operational load on the vehicle component in contrast to a minimal or lighter operational load on the vehicle component.

Figure 4:
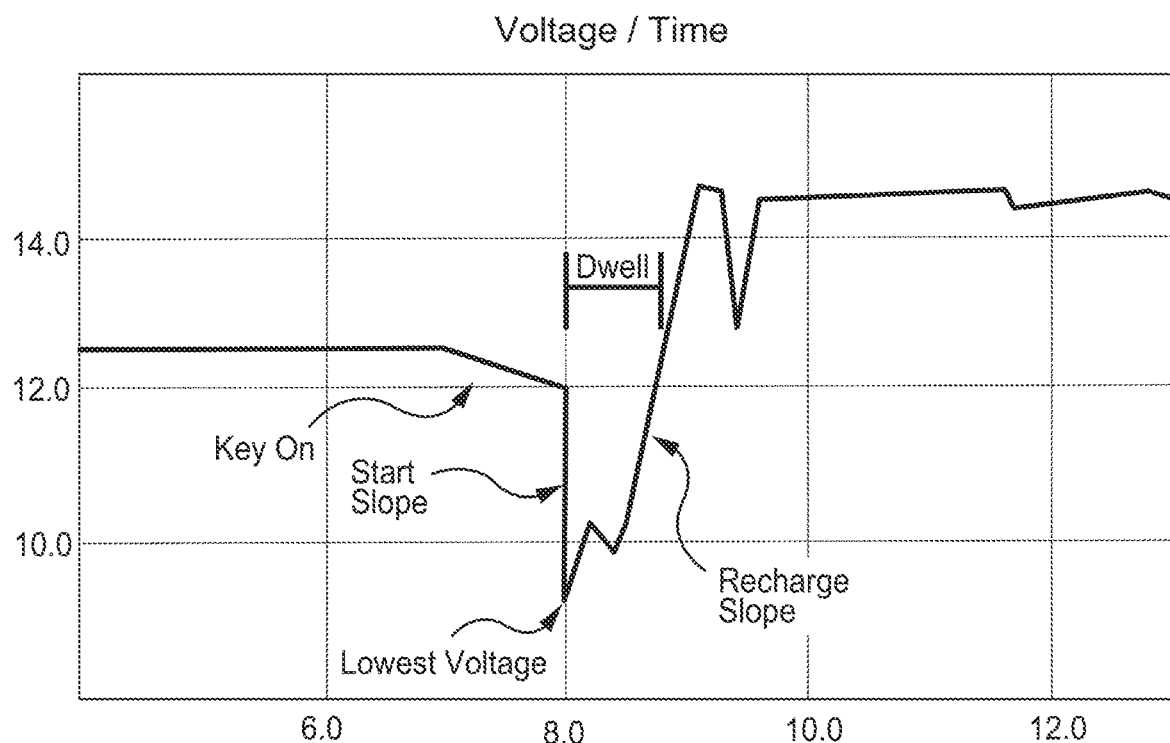
FIG. 4 is a diagrammatic view of a voltage curve from a good battery based upon a vehicle cranking event illustrating the battery voltage drop, dwell time and recovery slope to recharge the battery.
Figure 5:
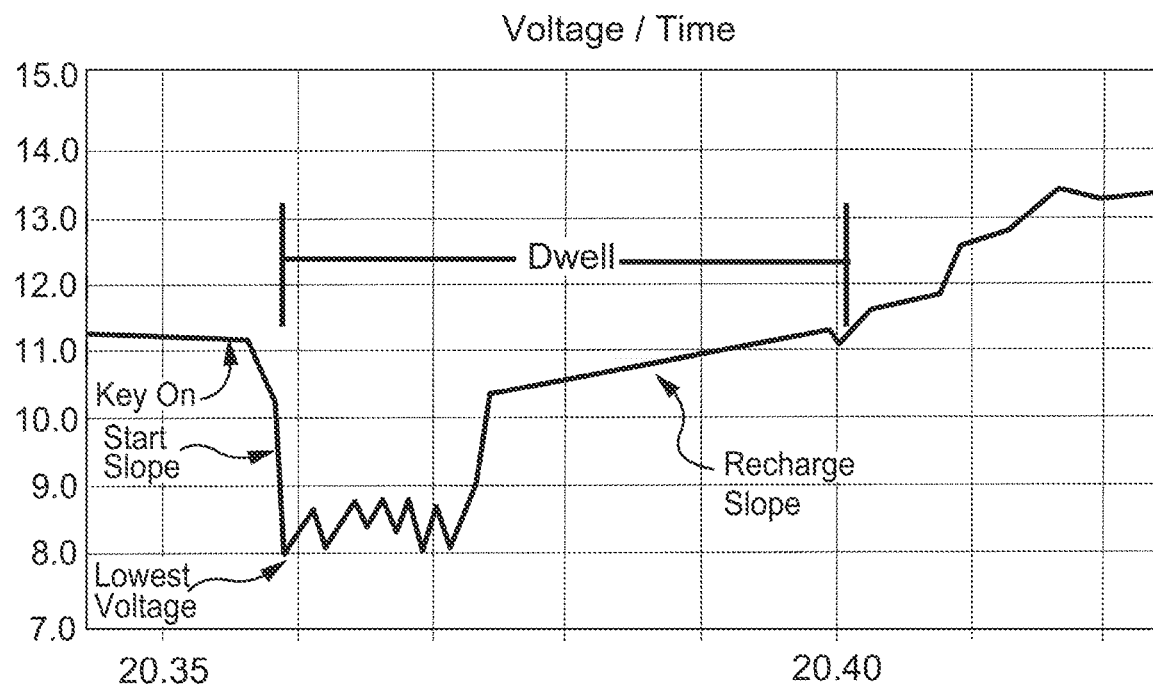
FIG. 5 is a diagrammatic view of a voltage curve from a poor battery based upon a vehicle cranking event illustrating the battery voltage drop, dwell time and recovery slop to recharge the battery.

Referring now to FIG. 4 and FIG. 5, the voltage versus time is illustrated for a good battery and a poor battery. FIG. 4 illustrates a good battery cranking event voltage curve. When the vehicle ignition key is activated, the voltage starts to decrease slightly followed by a very steep drop in the voltage. Then, after the cranking event has been completed, the voltage rises on a recharge slope within a dwell time where the voltage reaches a steady state for recharging the battery. FIG. 5 illustrates a poor battery cranking event voltage curve. The initial voltage is lower for the poor battery. When the vehicle ignition key is activated, the voltage starts to decrease slightly followed by a very steep drop in the in the voltage. Then, after the cranking event has been completed, the voltage rises on a more shallow recharge slope within a longer dwell time where again the voltage reaches a steady state for recharging the battery. In this embodiment, 10 voltage readings are recorded for each cranking event. The number of voltage readings could be lower, for example 5 or higher, for example 15. From this collection of data readings either the minimum voltage of all these readings may be used or alternatively, an average of more than one of the readings may be used to arrive at the minimum voltage level based upon a vehicle component cranking event.

Figure 6:
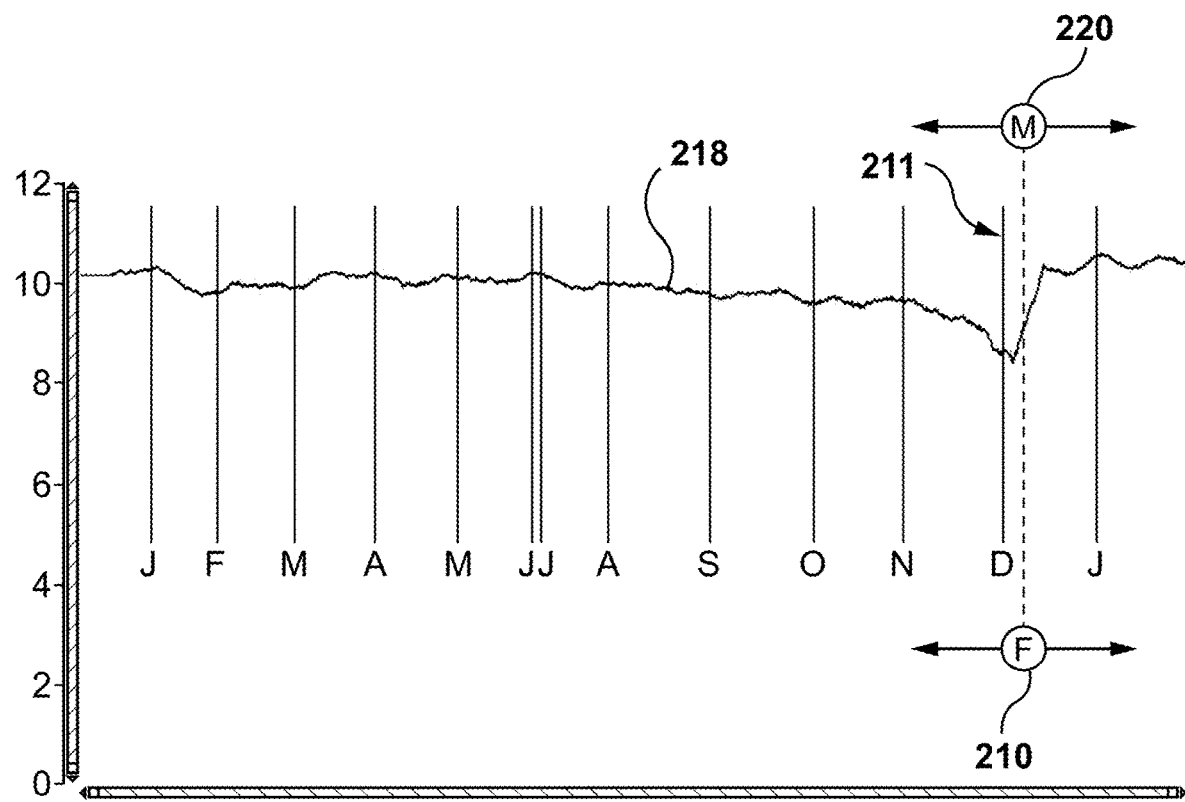
FIG. 6 is a diagrammatic view illustrating a moving average of raw vehicle component data over the life cycle of a vehicle component with an event such as a failed vehicle component or maintenance of a vehicle component.

The raw big telematics data 200 representative of the vehicle component operational life cycle of FIG. 3 may be filtered to smooth out short-term fluctuations and highlight longer-term trends in the life cycle data. This is illustrated in FIG. 6. The raw big telematics data 200 is filtered to provide a moving average 218 derived from the raw big telematics data 200. Alternatively the moving average could be ranges of the data, averages of the data or the result of a low pass or impulse filter. In addition to the raw big telematics data 200 that is monitored, log and stored, additional vehicle component event 211 data is also provided. Vehicle component event 211 data is typically sourced differently and separately from the raw big telematics data 200 but may also be sourced with the raw big telematics data 200. When sourced differently and separately, the vehicle component event 211 data is obtained from maintenance records or a vehicle maintenance database. The vehicle component event 211 data may include the type of event, the date of the event and time of the event. Vehicle component event 211 data includes at least one of either a failure event 210 or a maintenance event 220 concerning the vehicle component. The vehicle component event 211 data defines a known event with respect to the vehicle component and is associated with the moving average 218 representative of the raw big telematics data 200. Individual values or data points of the moving average 218 data are steadily decreasing over time up to the point of the vehicle component event 211. Immediately after the vehicle component event 211, the individual values or data points of the moving average 218 data sharply increase over a shorter period of time and then maintain a relatively consistent moving average 218 going forward in time. The different patterns of the moving average 218 data are indications of a process change between a vehicle component good state, a poor state, a failed state, a new state and/or a refurbished state.

Figure 7:
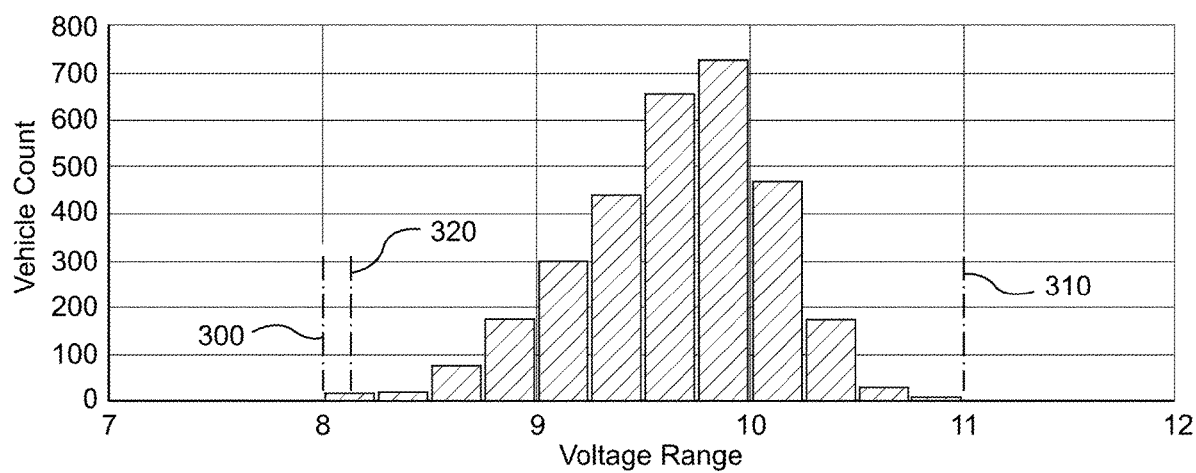
FIG. 7 is a diagrammatic view illustrating a voltage distribution of the moving average of operational values of vehicle components for all vehicles of like category, class or classification in a fleet.

In an embodiment, FIG. 7 illustrates a voltage distribution of the moving average of operational values of vehicle components for all vehicles of like category, class or classification in a fleet of just over 3000 vehicles for current or real time snap shot. The like category, class or classification of vehicles in a fleet may refer to vehicles in a fleet sharing common characteristics such as, for example, gas engine type, diesel engine type, and/or the number of batteries in the vehicle. In the embodiment, the vehicles in the fleet are of like engine and fuel type. The X axis represents the component operational value and the Y axis represents the vehicle count. In an embodiment, the operational values of voltage are a moving average of the minimum battery voltage for a cranking event. The inventor recognized and appreciated similar voltage distributions may be calculated for predetermined times from historical raw big telematics data for differing classes of vehicles and these distributions while similar in pattern may extend across different minimum voltage values for the batteries during a cranking event. Of the vehicles included in these types of voltage distributions for each class of vehicles, the inventor recognized and appreciated from statistical analysis that typically 99.7% of the values from the data set may lie between −3 and +3 standard deviations. The inventor recognized and appreciated that these voltage distributions may have different voltage ranges for differing classes of vehicles and regardless of class each of the battery voltages yields 99.7 percent of the values from the data set lying within −3 and +3 standard deviations of the distribution curve for the class of vehicle to which it belongs. Thus from each distribution of operational component values for the same class of vehicles and from the histogram of operational component values over time as shown in FIG. 3, the inventor recognized and appreciated that minimum and maximum threshold operational values based upon the measured component event may be identified for each distribution curve that are representative of the health of the vehicle component. In the battery embodiment of FIG. 7, the identified minimum operational threshold voltage value based upon or related to the cranking event is indicated at 300 and the identified maximum operational threshold voltage value at cranking is indicated at 310. The lower or minimum operational threshold voltage value 300 may be identified as 8.0 V for this class of vehicle. This minimum or lower threshold voltage value during cranking may be representative of the battery vehicle component having deteriorated to no longer reliably function to start the vehicle during a cranking event. It is appreciated that the minimum operational threshold voltage value may differ from 8.0 V for different classes of vehicle or battery. For the battery of the embodiment of FIG. 7, an upper or maximum operational threshold voltage value during starter motor cranking 310 may be identified as 11 V for this class of vehicle where the maximum operational threshold voltage value during a cranking event may be voltage representative a new battery. It is appreciated that the maximum operational threshold voltage value may differ from 11 V for a different class of vehicle or battery. It should be appreciated that the terms minimum and maximum as used herein may not represent a true minimum or maximum voltage reading during a vehicle cranking event experienced by all batteries of like vehicles in the fleet and that some batteries may operate beyond these ranges for limited times. It should be appreciated that the minimum and maximum operational threshold voltage may vary based upon environmental conditions experienced during the cranking event such as for example, ambient temperature conditions, and operating voltages during colder conditions may be used when determining the minimum and maximum operational threshold voltage values. Thus these minimum and maximum operational threshold values are predictive indicators of the health of the vehicle component.

In addition to these minimum and maximum operational threshold values being predictive indicators the health of the vehicle component, the inventor recognized and appreciated that identification of an intermediate threshold value relative to and greater than the minimum threshold value, and also based upon the measured component event, such as a starter motor cranking event for a battery component, in an embodiment may provide for triggering of a component health pre-failure signal that may be communicate to the fleet owner to initiate service on the vehicle component. This communication may be in the form of a notification such as an email or other electronic message or may be a flag brought to the attention of the fleet owner when monitoring the status of the fleet through an internet portal.

In the embodiment of FIG. 7, the intermediate threshold value is shown at 320 to be 8.15 V for this class of vehicle and battery. In the embodiment where the vehicle component is a battery, the intermediate threshold voltage value based upon or related to a cranking event for the starter motor triggers a component health pre-failure signal that can be communicated to the fleet owner. The fleet operator may then perform an electrical service inspection on the vehicle to determine the health status of the battery and/or other components in the vehicles electrical system such as for example, the battery cables, the alternator and/or the starter motor. Triggering an early or pre-failure signal allows for preventative maintenance of the vehicle component. In an embodiment, the intermediate threshold voltage value during the cranking event may provide real time electrical system health status parameters representative of at least one of a battery status, battery cable status, starter motor status and alternator status. It is understood that the intermediate threshold voltage value may differ for different classes of vehicle and battery.

Telematics Predictive Component Health Standardization and Normalization

Figure 8A:
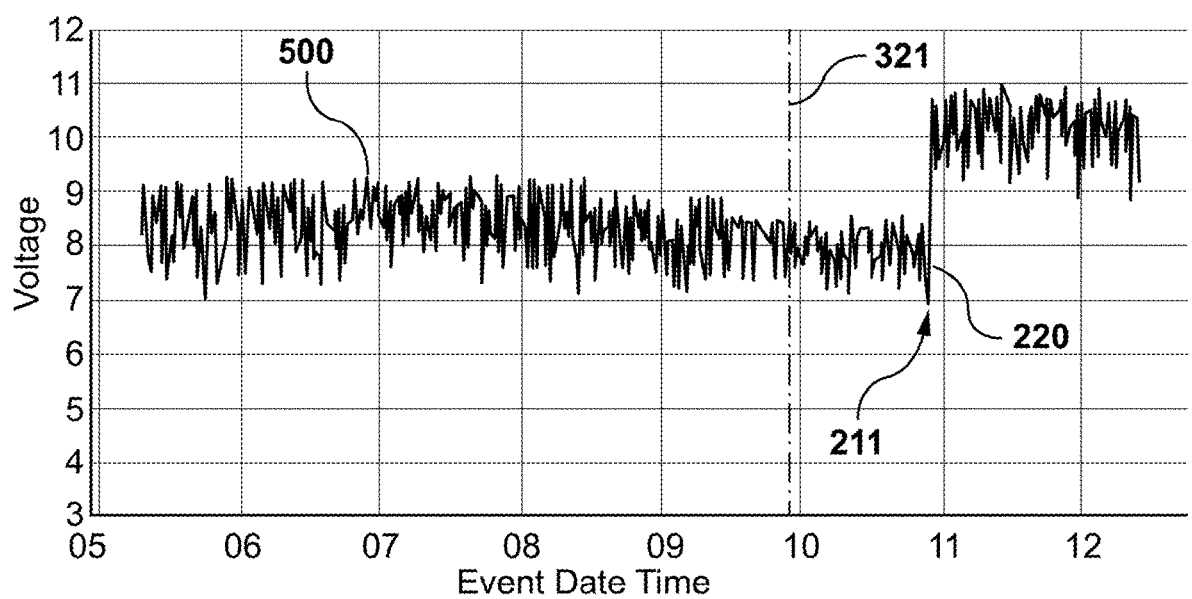
FIGS. 8a through 8d are diagrammatic views on an embodiment illustrating unfiltered minimum voltage events, filtered minimum voltage events, unfiltered minimum voltage events with applied electrical system ratings and normalized electrical system rating for the filtered minimum voltage events.
Figure 8B:
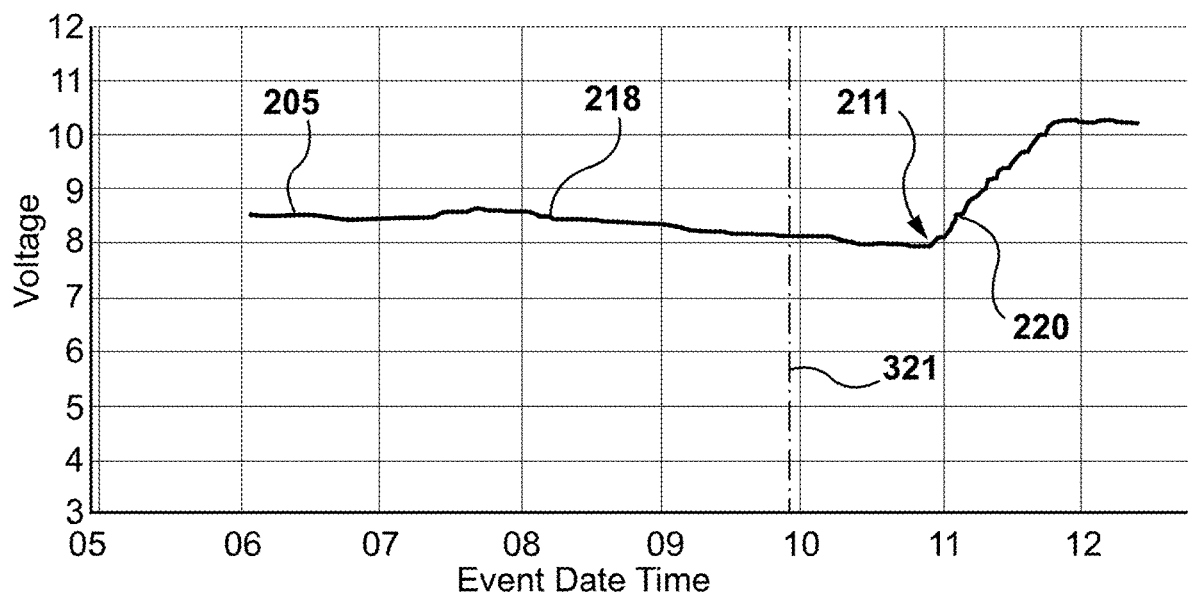

Referring to FIG. 8a there is shown a plot of minimum battery voltages during cranking events and in FIG. 8b there is shown a plot of moving average minimum voltage values measured at cranking events as measured over months starting in May and ending in December. FIG. 8a is for one vehicle in a fleet of vehicles. The Y axis represents battery voltage and the X access is the event date and time of the starter motor cranking event as logged over about seven months. The recorded minimum voltage values 500 measured or determined at cranking are relatively noisy. The minimum voltage values in FIG. 8a prior to vehicle component event 211 are shown between about 7 volts and slightly over 9 volts where the median voltage decreases in value over time. The vehicle component event 211 in this embodiment may be a battery replacement, refurbishment or a change to the alternator or battery cables. After the vehicle component event 211, the minimum voltage values during cranking events increases rapidly. Due to the noisiness of the data, this decrease in the battery health status parameters is difficult to predict.

Referring to FIG. 8b, the X and Y axis are the same as in FIG. 8a, and the curve displayed is a moving average of the minimum voltage values at cranking events shown in FIG. 8a. In this embodiment, the moving average comprises a sample set of the last 100 minimum voltage values measured at cranking events over time including the current or real time minimum voltage reading and 99 previous readings. As can be seen in FIG. 8b, the resultant plot of moving average minimum voltage values measured at cranking events is much smoother when compared to the noisy unfiltered minimum voltage events in FIG. 8a. The smoothing effect of the filtering moving average shows the minimum voltage values at cranking gradually decreasing over time from about 8.54 volts at 205 down to close to 8 volts at the vehicle component event 211. Thereafter, the moving average of the minimum voltage values at cranking increases at 220 to about 10.5 volts. The slope of the increase in voltage is not as steep in FIG. 8b as in FIG. 8a due to the smoothing effect of the filtering by the moving average.

From the embodiment of FIG. 7, the intermediate threshold voltage value for the moving average is shown at 320 to be 8.15 V. When the moving average of the minimum voltage values 218 in FIG. 8b decreases to 8.15 V, a triggering event is generated. The triggering event is indicated at vertical line 321 in each of FIGS. 8a through 8d. The triggering event 321 triggers generation of a work order in an embodiment which is sent to and/or from the fleet owner to perform maintenance on the vehicle electrical system. This maintenance may be performed later in time as shown at the vehicle component event 211. In the exemplary embodiment, the work order may be generated late in September at 321 and the maintenance may be performed about one month later before the moving average minimum voltage value at cranking falls below the minimum threshold voltage of 8.0 V. This permits the fleet owners to schedule timely or just in time maintenance. After the maintenance event 211 has been performed the average minimum voltage rises to just over 10 V in FIG. 8b. While the intermediate threshold voltage value is 8.15 V, this value may be different for different classes of vehicles or batteries and has been chosen based on the historical big raw data of battery performance to provide sufficient lead time for the maintenance event to occur. If more or less time is required by a fleet operator to service its vehicles once the work order is triggered, then the intermediate threshold voltage value may be adjusted accordingly.

As mentioned above in the embodiment shown in FIG. 8b, the moving average comprises the most recent 100 samples of battery minimum voltages measured at cranking events. While the 100 samples provide a smooth curve, it should be understood that the number of events may be lower or higher than this number of samples in other embodiments. However, the minimum voltage of the most recent measured voltage at the cranking event forms part of the moving average and this overall average is a good representation of the battery health. The inventor recognized and appreciated that for different types of fleets of vehicles there may be different number of samples measured for the minimum voltage at the cranking events. For example, in a courier business, the trucks in the vehicle may be started anywhere from 150 to 200 times a day. Accordingly, the moving average of FIG. 8b would be a real time average that falls within the last working day of the vehicle. For other types of trucks of vehicle fleet, for example, a truck delivering food or beverage items to stores having about 10 to 15 stop and starting events in a day, then this 100 sample minimum voltage moving average may be obtained over the last five to seven days of the operation of the vehicle. The inventor realized and appreciated that the 100 samples effectively covers both these described vehicle embodiments. It is appreciated that for vehicles in a fleet having different stop and start considerations, the number of samples making up the moving average may have to be altered to provide a real-time or near real time predictive indication of the battery health status.

The inventor recognized and appreciated that the minimum operational threshold value represented to of a failing health condition of the vehicle components and or the maximum operational threshold value representative of an optimal health condition of the vehicle component may be used to determine a predictive health status rating parameters in real time, including real-time component health status parameters which could be contextualized across all batteries in the class of vehicle as well as batteries across different classes of vehicles. Such a contextualized battery or electrical system health rating parameter simplifies for fleet owners health status parameters in fleets of like vehicle classes and across fleets of differing vehicle classes.

In an embodiment, operational component data and at least one threshold operational value are associated to identify the real-time component health status parameters of the vehicle component. In an embodiment, this associating may involve standardizing the operational component data with at least one threshold operational value to identify standardized real-time component health status parameters of the vehicle component. In an embodiment, the vehicle component includes a battery and the real-time electrical system health parameters are based at least in part on scaling each of the minimum voltage signals at cranking with the minimum operational threshold value determined for a cranking event. An example of this scaling is shown in FIG. 8c.

Figure 8C:
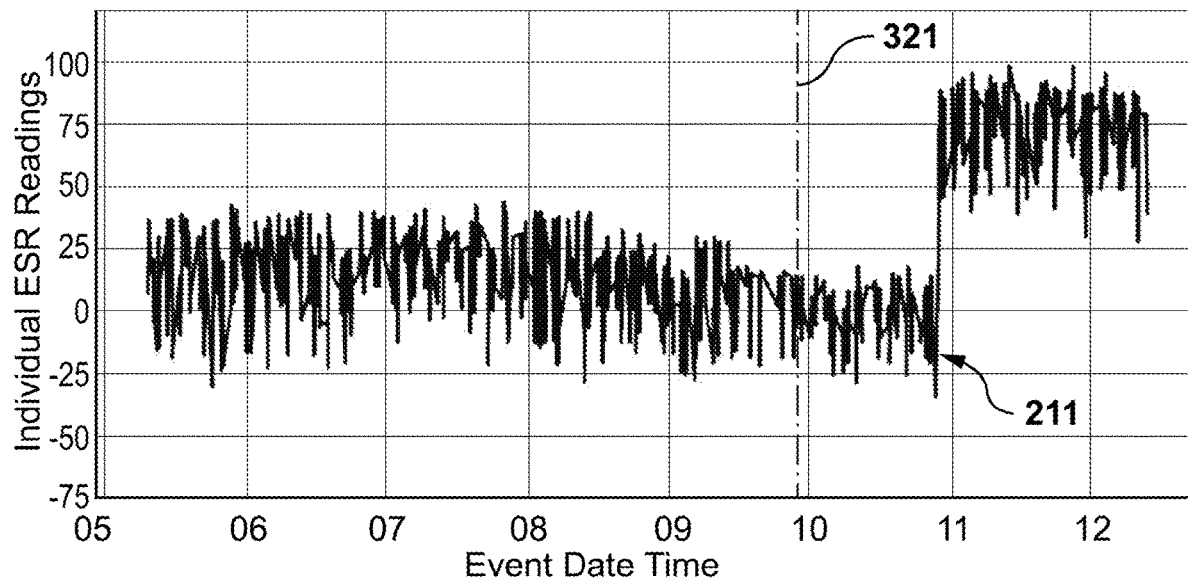

FIG. 8c is a plot of the minimum voltage events of FIG. 8a, as compared to the minimum operational threshold value identified for the battery. The X axis of FIG. 8c corresponds to the X axis of FIG. 8a and the Y axis represents individual electrical system rating (ESR) readings. In this instance, the minimum threshold voltage value was identified as 8.0 V. The minimum voltage events of FIG. 8a are standardize to transform the data to have a mean of zero for 8.0 V. This standardization permits for all vehicles of like class to have their vehicle component compared relative to each other. Moreover it allows for vehicles of different classes to be compared relative to each other as the voltage values revert to the mean of zero. It should also be understood that the graph of FIG. 8c has not been filtered or smoothed and that in another embodiment, the results may be filtered providing a smoother graph approaching the mean of zero which would be more readily identifiable as the battery component approached its minimum operational threshold value and mean of zero. The standardized real-time component health status parameters can be communicated to the fleet owner so that the fleet owner may then schedule preventative battery or vehicle component maintenance for vehicles in its fleet in both near future (next month) and the more distant future of 2 months or more. After the vehicle component event 211, such as battery replacement, refurbishment or alternator replacement or battery cable replacement, the mean value of the battery minimum voltage signals during a cranking event rises to about 75.

Figure 8D:
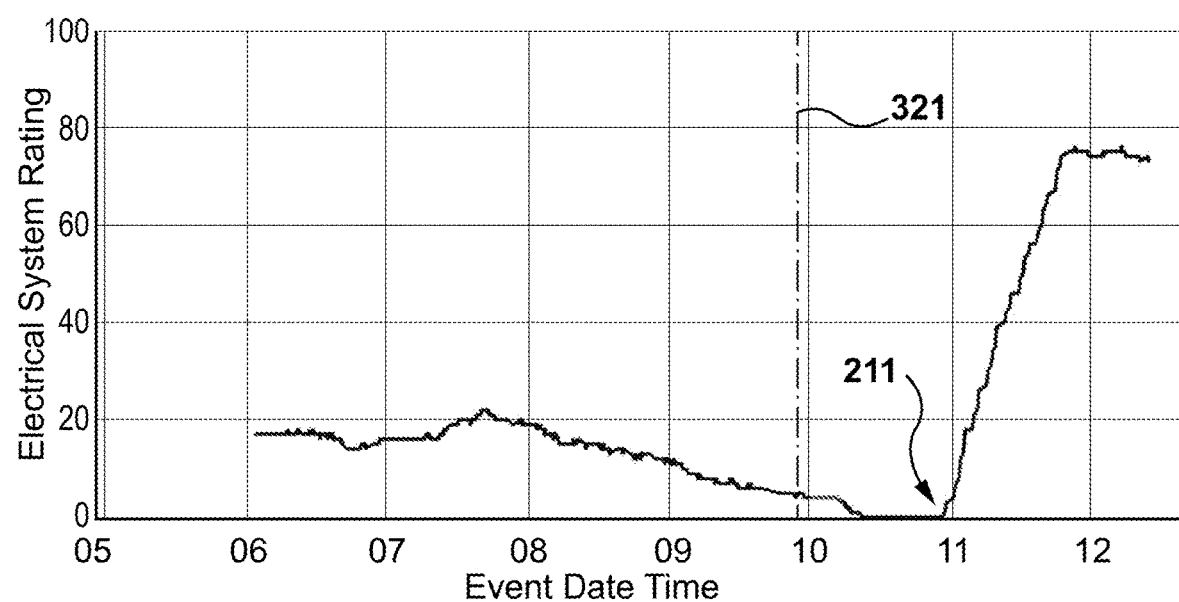

FIG. 8d represents an embodiment illustrating normalized real time electrical system health status rating parameters normalized relative to the minimum operational threshold voltage value (Vmin) representative of a failing health condition of the electrical system based upon a cranking event of the starter motor and a maximum operational threshold voltage value (Vmax) representative of an optimal health condition of the electrical system based upon a cranking event of the starter motor. The X axis corresponds to the x axis of FIGS. 8a, 8b and 8c. The Y axis is a normalized value between 0 and 1 scaled by a factor of 100. In one embodiment, for FIG. 8d, the results of FIG. 8a have been normalized and filtered by a moving average of 100 samples. In an alternative embodiment, the results of FIG. 8d may represent the normalization of the smoothed curve in FIG. 8b. The inventor recognized and appreciated that normalization could be achieved by unity-based normalization which is a feature scaling approach to bring all values into a range between 0 and 1. Feature scaling is performed wherein each moving average minimum voltage value during cranking events (V) of FIG. 8b is scaled to derive the normalized real time electrical system health status rating parameters (H) of the vehicle as follows:

$$H=(V-V\text{min})/(V\text{max}-V\text{min}) \quad (1)$$

The unity-based normalization values are then scaled again by a factor of 100 to show the curve of FIG. 8d. In an embodiment Vmin has a value of 8 V and Vmax has a value of 11 V. From equation (1), for a new battery, the minimum voltage at cranking is 11 V and the battery rating would then beH×100=100. For a battery having minimum voltage at cranking of 8.0, the battery rating would by 0×100=0. Hence the curve of FIG. 8d shows a battery health status rating starting at about 22 for a battery that has been in use and over 4 months. This rating generally gradually decreases to about a rating of 5 wherein the maintenance work order event 321 is triggered resulting in a vehicle component event or in this embodiment an electrical maintenance event 211. After the maintenance is performed, the battery rating rises up to a rating of about 75. For a battery rating of 75, which is less than 100 for replacement with a fully functional new battery, the maintenance event may have been the replacement of the battery with a refurbished battery, and/or a change of the alternator or battery cable. As discussed above, the curve of FIG. 8d may be employed to trigger the vehicle component event 321 at a health rating (H) of about 5. The rating of 5 corresponds to an intermediate threshold voltage value of 8.15 V, in this embodiment, normalized to a health status rating parameter H and scaled by a factor of 100. The advantage associated with this predictive analysis is that it allows for normalized health status rating parameters for vehicle components such as, for example, batteries, to be compared relative to each other regardless of vehicle classification since the normalizing factors in each classification of vehicle are related to or dependent upon that class of vehicle. Further, real-time battery status rating indicators representative of the health of the battery status may be generated for all vehicles in the same class vehicles or different classes of vehicles owned by fleet owner. These ratings can then be communicated to the fleet owner so that the fleet owner may then schedule preventative battery or vehicle component maintenance for vehicles in its fleet in both near future (next month) and the more distant future of 2 months or more.

Figure 9A:
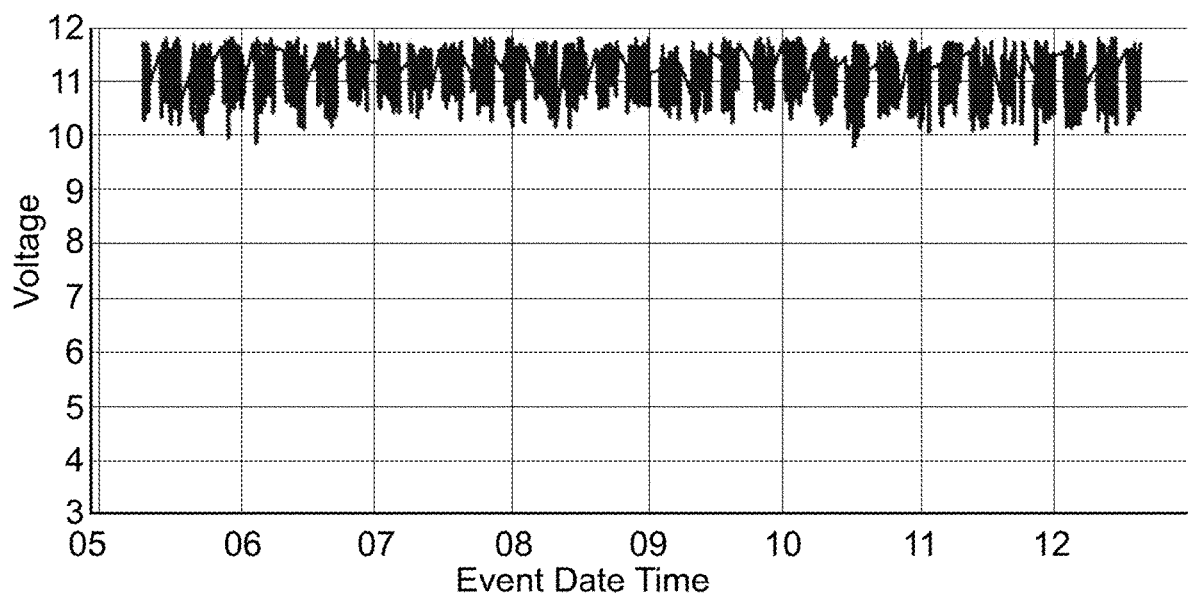
FIGS. 9a through 9d are diagrammatic views on another embodiment illustrating unfiltered minimum voltage events, filtered minimum voltage events, unfiltered minimum voltage events with applied electrical system ratings and normalized electrical system rating for the filtered minimum voltage events.
Figure 9B:
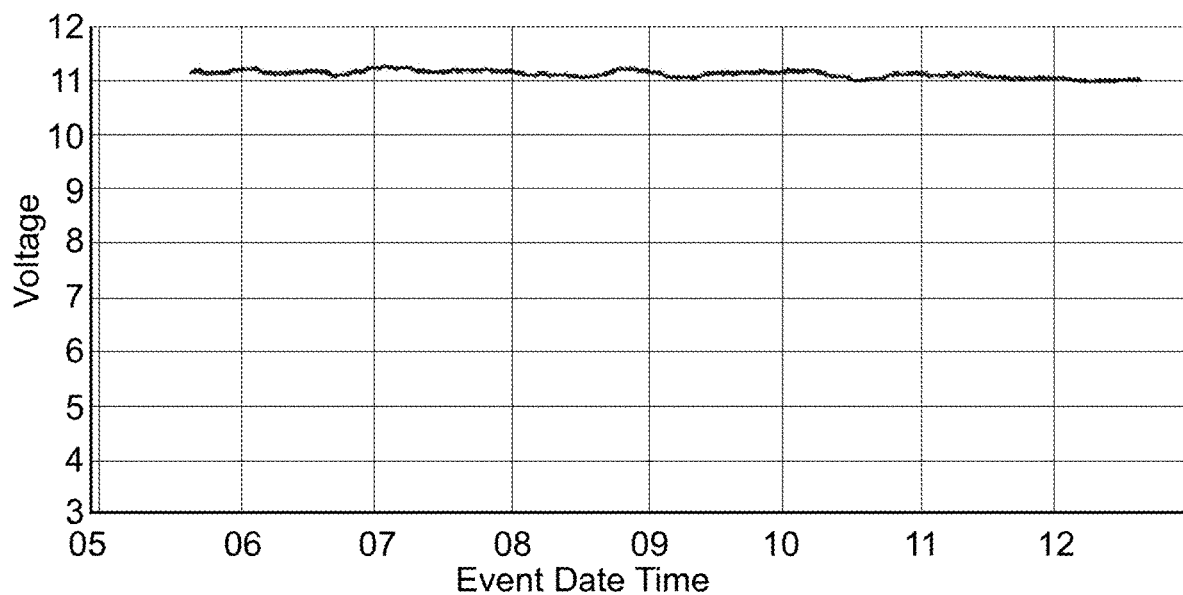
Figure 9C:
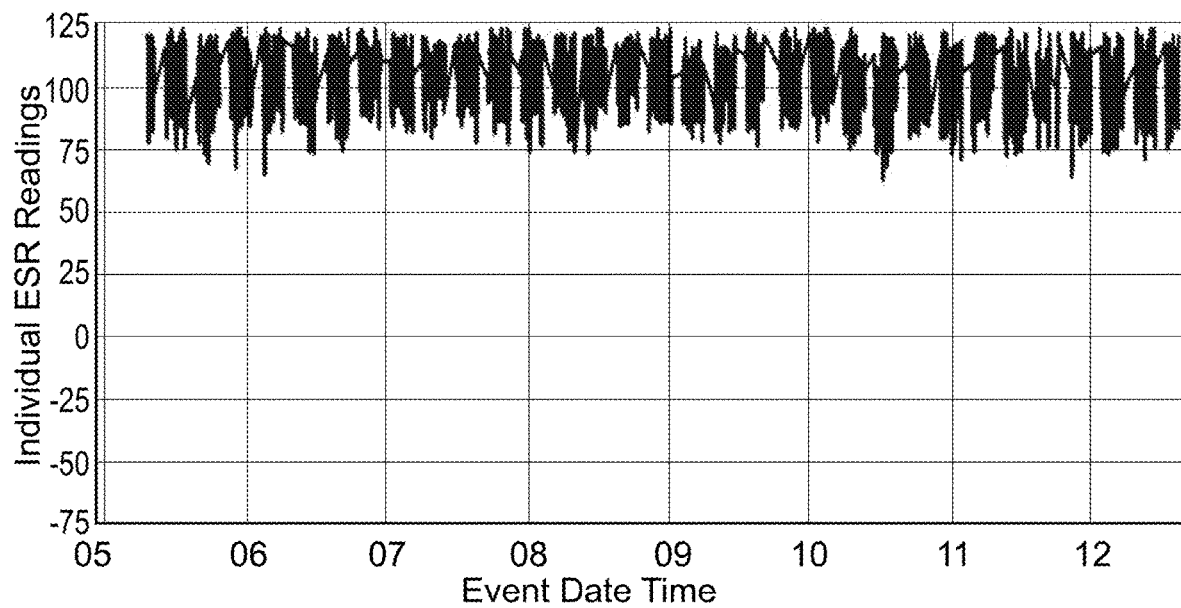
Figure 9D:
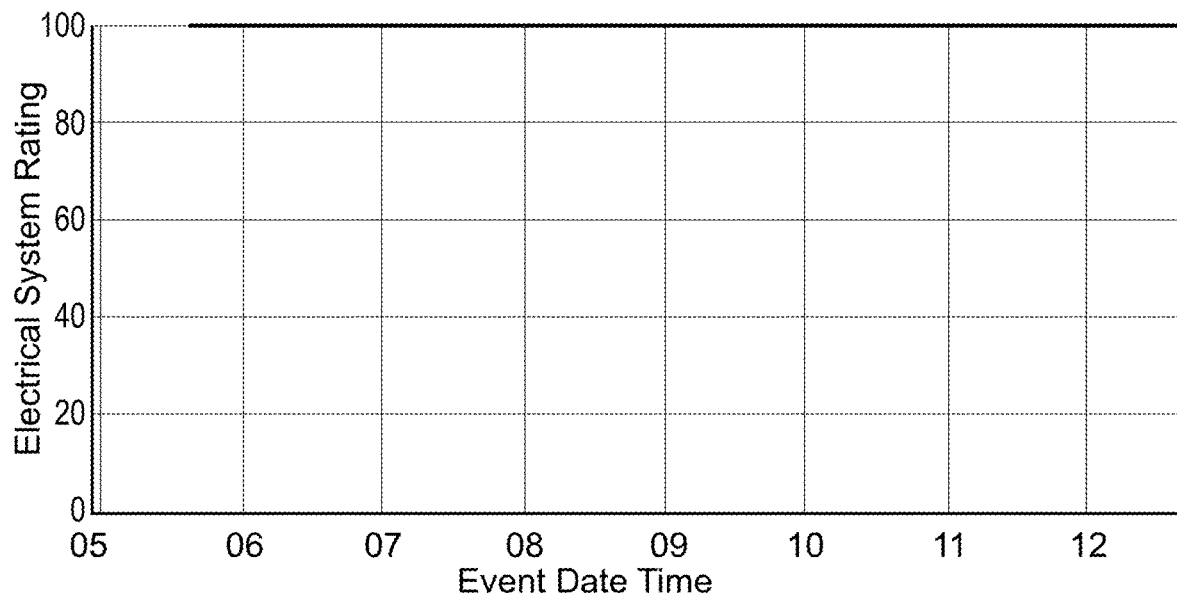

FIGS. 9a through 9d correspond to FIGS. 8a through 8d with the difference being that the battery represented is a new battery in FIGS. 9a through 9d. The minimum voltage events in FIG. 9a are fluctuating close to or just above the 11 V level. The moving average is shown to be slightly above 11 V in FIG. 9b. The minimum voltage events with the applied standardized electrical system rating are shown in FIG. 9c with valuations of about or close to the 100 scale plus or minus 25, well above the mean of 0. In FIG. 9d the normalized real time electrical system health status rating parameters H are consistently at 100.

Figure 10A:
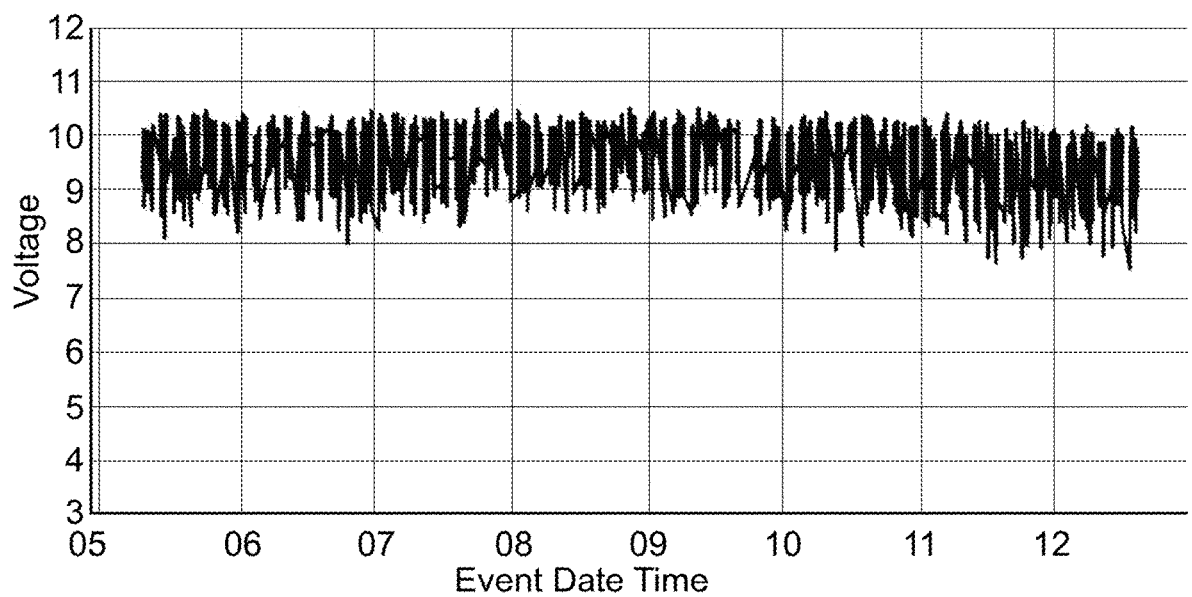
FIGS. 10a through 10d are diagrammatic views on yet another embodiment illustrating unfiltered minimum voltage events, filtered minimum voltage events, unfiltered minimum voltage events with applied electrical system ratings and normalized electrical system rating for the filtered minimum voltage events.
Figure 10B:
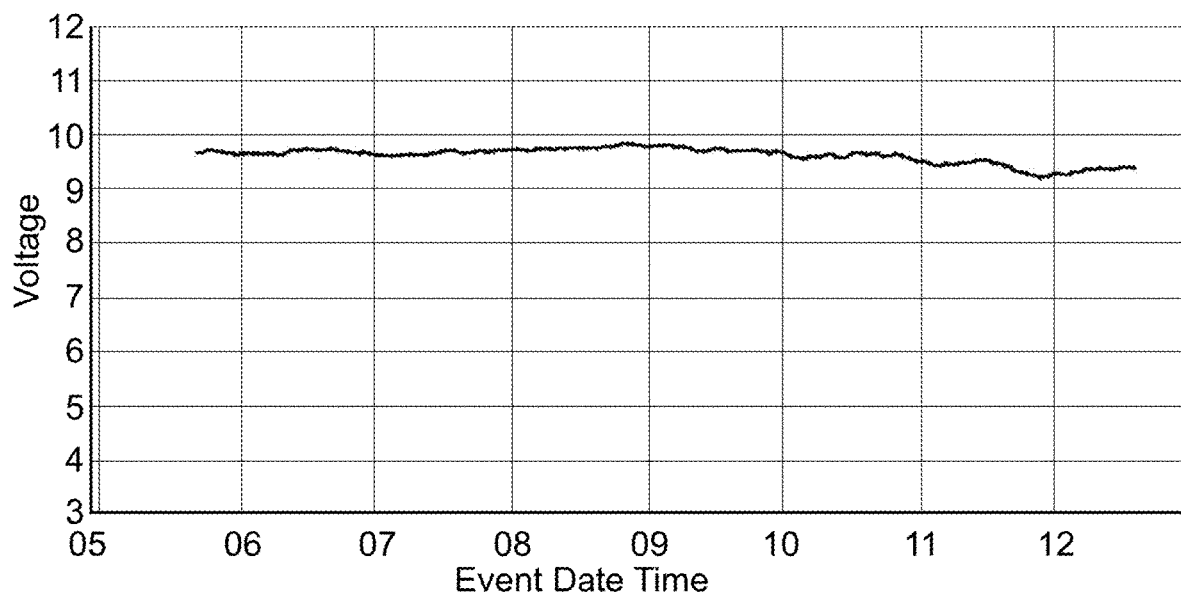
Figure 10C:
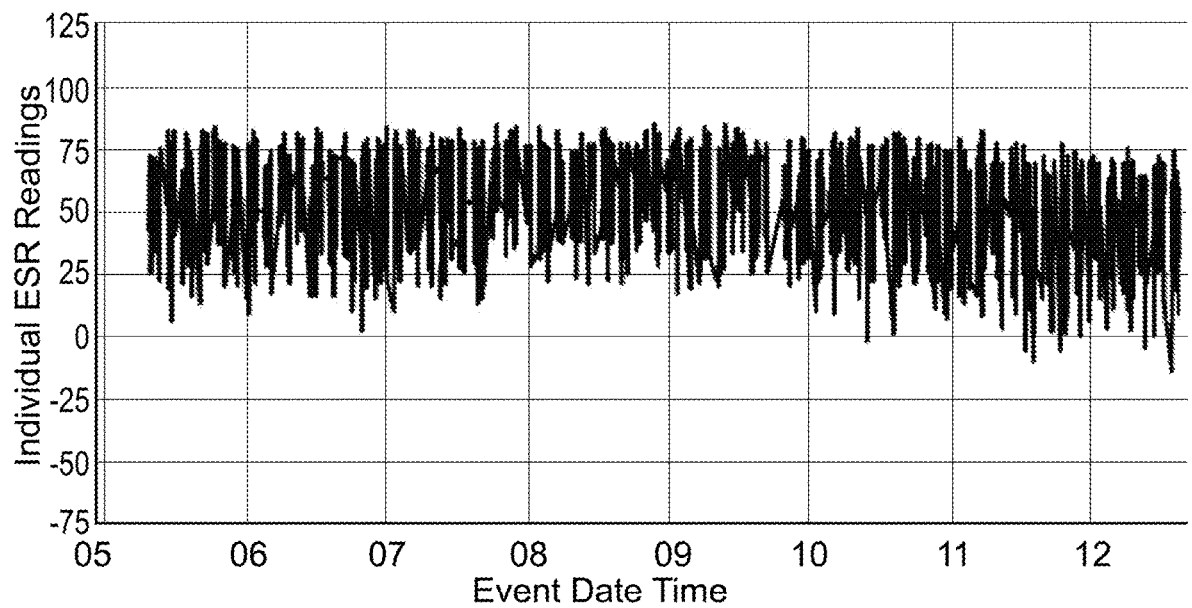
Figure 10D:
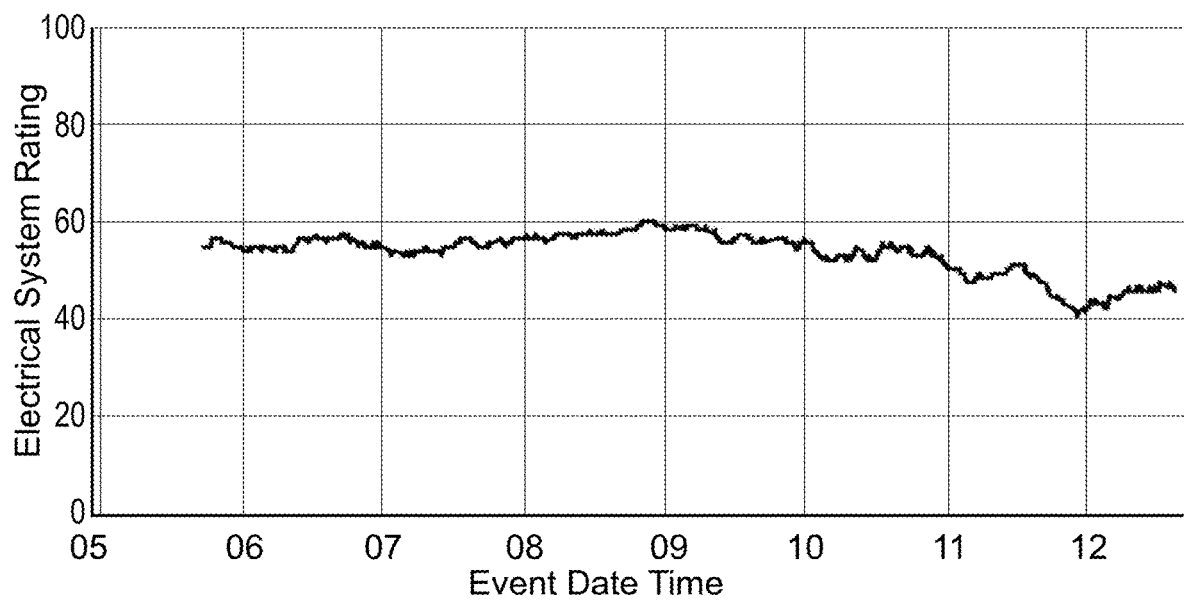

Referring to FIG. 10a through 10d, there is shown Figures similar to FIGS. 8a through 8d. However, in this embodiment, the battery is not a new battery and is nearing midlife. In FIG. 10a the minimum voltage signals at cranking events are between 8 V and 10½ V. In FIG. 10b, the smoothing average of the battery minimum voltage values for the cranking events is about 9.7 V. The minimum voltage values at cranking events when standardized are shown in FIG. 10c having a mean around 50 with deviation between 0 and slightly above 75. The normalized rating in FIG. 10d of real time electrical system health status rating parameters shows a battery health rating is just over 50.

Accordingly, it should be understood that a real time battery health rating may be ascertained for each vehicle in the fleet or across differing fleets. For the normalized rating this scaled rating will be a between 0 and 100 with 0 representing a battery that is going to fail and 100 representing a new battery. The generation of normalized real time electrical system health status rating parameters based at least in part on normalization of the plurality of minimum voltage signals with the minimum and maximum operational threshold voltage values allows for prediction in real time of the health status of the electrical system components in and across it fleets to effect timely or just in time maintenance servicing of the electrical systems of its vehicles.

Figure 11A:
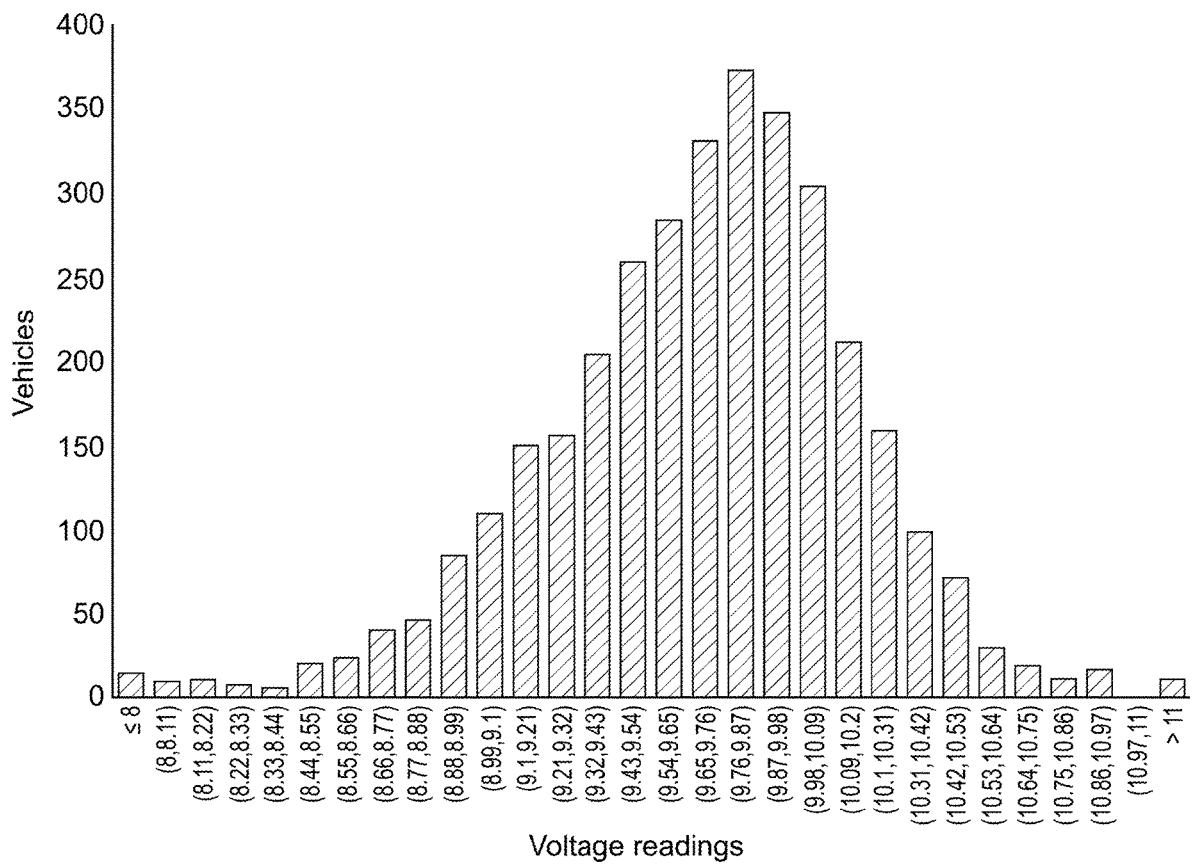
FIG. 11a is a diagrammatic view of a distribution curve of minimum voltage readings during a cranking event for an embodiment of all gas vehicles.
Figure 11B:
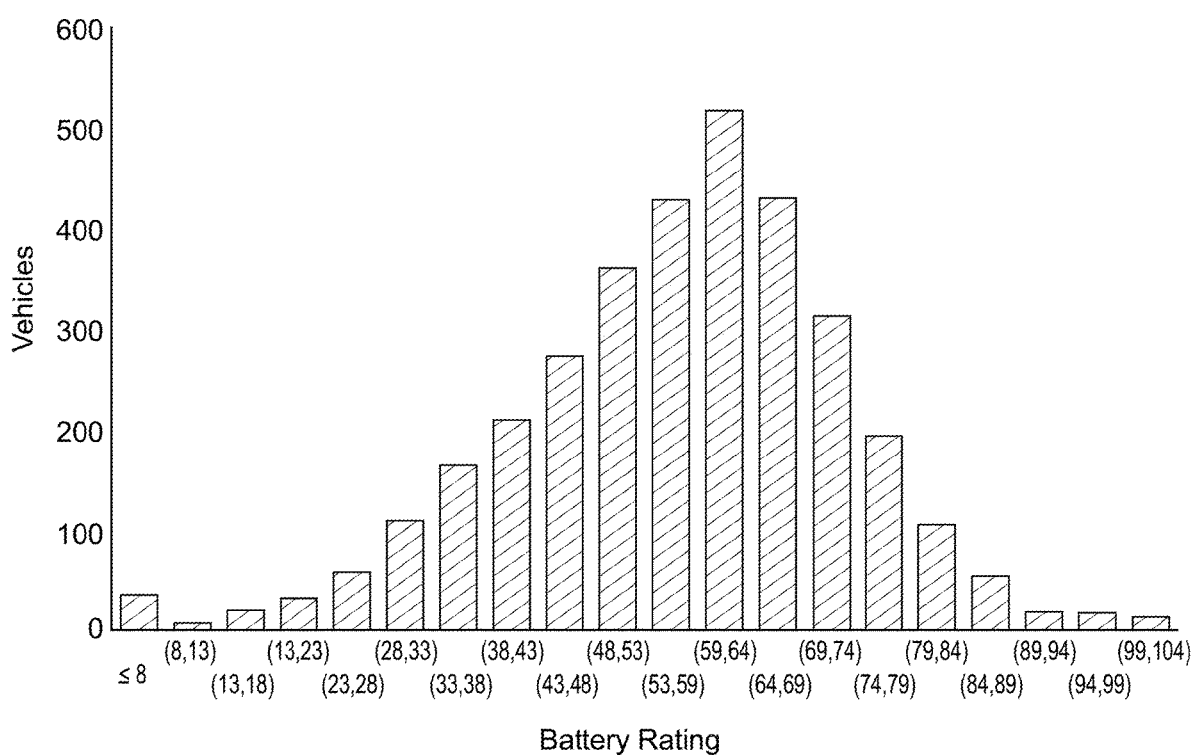

Referring to FIG. 11a there is shown snapshot of minimum voltage readings measured during cranking events for an embodiment of all gas vehicles for a fleet of 3401 vehicles having common vehicles and battery types. The X axis is voltage with each bar in the graph shown by its voltage range, and the Y axis is vehicle count. The results of FIG. 11a follow a standard distribution curve. FIG. 11b identifies real time normalized health status rating parameters of an electrical system of the vehicles shown for the vehicle data of FIG. 11a. The X axis is the normalized real time electrical system health status rating parameters based at least in part on normalization of the plurality of minimum voltage signals with the minimum and maximum operational threshold voltage values and scaled by a factor of 100. Each bar in the graph is identified in the X axis by its normalized rating range. The Y axis is the vehicle count. FIG. 11b also follows a standard distribution curve similar to that of FIG. 11a. The inventor recognized and appreciated that the standard distribution curve of FIG. 11b is more easily readable and allows fleet operators to determine how many battery vehicle components may need to be scheduled for maintenance in real time. In the embodiment of FIG. 11b there are about 30 vehicles with an electrical system rating of less than 8. The inventor recognized and appreciated the value of this information being made available to fleet operators allows for the timely and/or just in time maintenance of the electrical system of the 30 vehicles with a rating of 8 or less. Further, the fleet operator can compare normalized real time electrical system health status rating parameters for different classes of vehicles and electrical systems due to the normalization of the information whereby distribution curves similar to that of FIG. 11b for different classes of vehicles may be cumulatively superimposed on one another to provide an overall representation of the health status rating for all batteries in the fleet.

Telematics Predictive Component Remaining Effective Life

The inventor recognized and appreciated identification of real time component remaining effective life status parameters of a vehicle component allow the owner sufficient lead time to manage the upcoming costs associated with purchasing and replacement of the vehicle component. It permits the fleet owner to purchase replacement components in bulk or on a scheduled basis permitting improved budgeting of costs for the fleet owners managing the vehicles in the fleet. However, determining when a vehicle component's useful life will end and associating an effective life status parameter therewith is no simple task.

The inventor recognized and appreciated from the normalized battery performance curve scaled by a factor of 100 as shown in FIG. 8D, when not so scaled, would provide a battery rating curve over the operational life of the battery having normalized values between 0 and 1 where 0 represents an end of serviceable life where the vehicle component, battery, no longer functions as required to start the vehicle. While the battery component may still have a voltage level, this voltage level under a starter motor cranking load condition is insufficient to perform the required function of starting the vehicle.

The inventor further recognized and appreciated that life span of the vehicle component in its operating environment in an embodiment can be determined from an analysis of historical raw big data of the vehicle component when compared with maintenance logs of fleet owners. This historical information when associated the normalized real-time component health status parameters of the vehicle component identifies real time component effective life status parameters for the vehicle component.

In other embodiments, the span of the vehicle component value may be determined from the vehicle component manufacturer's life expectancy specifications or a combination of vehicle component manufacturer's life expectancy specifications and the historical information of telematics big raw data.

In an embodiment, real time component remaining effective life status parameters of an electrical system of a vehicle may be identified wherein for each battery in the fleet in real time a normalized electrical system health rating parameter (H) may be determined in accordance with formula (1). This normalized rating, as discussed before, is determined from a moving average and may have a value between 0 and 1, inclusive. When this normalized rating value is factored against the expected life of the battery, a remaining life in days, weeks, months or years can be determined. For example, when expected life of a battery is 36 months and the battery rating parameter is 0.4, then the expected remaining life of the battery is 14.4 months. The inventor recognized and appreciated that the performance curve of the like batteries in the fleet may be non-linear and may more rapidly decline near the end of life and may be subject to variations due to ambient operating conditions. However, the inventor recognized and appreciated that for a large portion of the battery life cycle the variation in the moving average of the minimum voltage readings during a cranking event is relatively linear over time and that at any given real time, remaining effective life of the vehicle component when made available to fleet operators provides useful information for predicting future costs and scheduling of vehicle component preventative maintenance.

Telematics Predictive Component Failure Data

Figure 12:
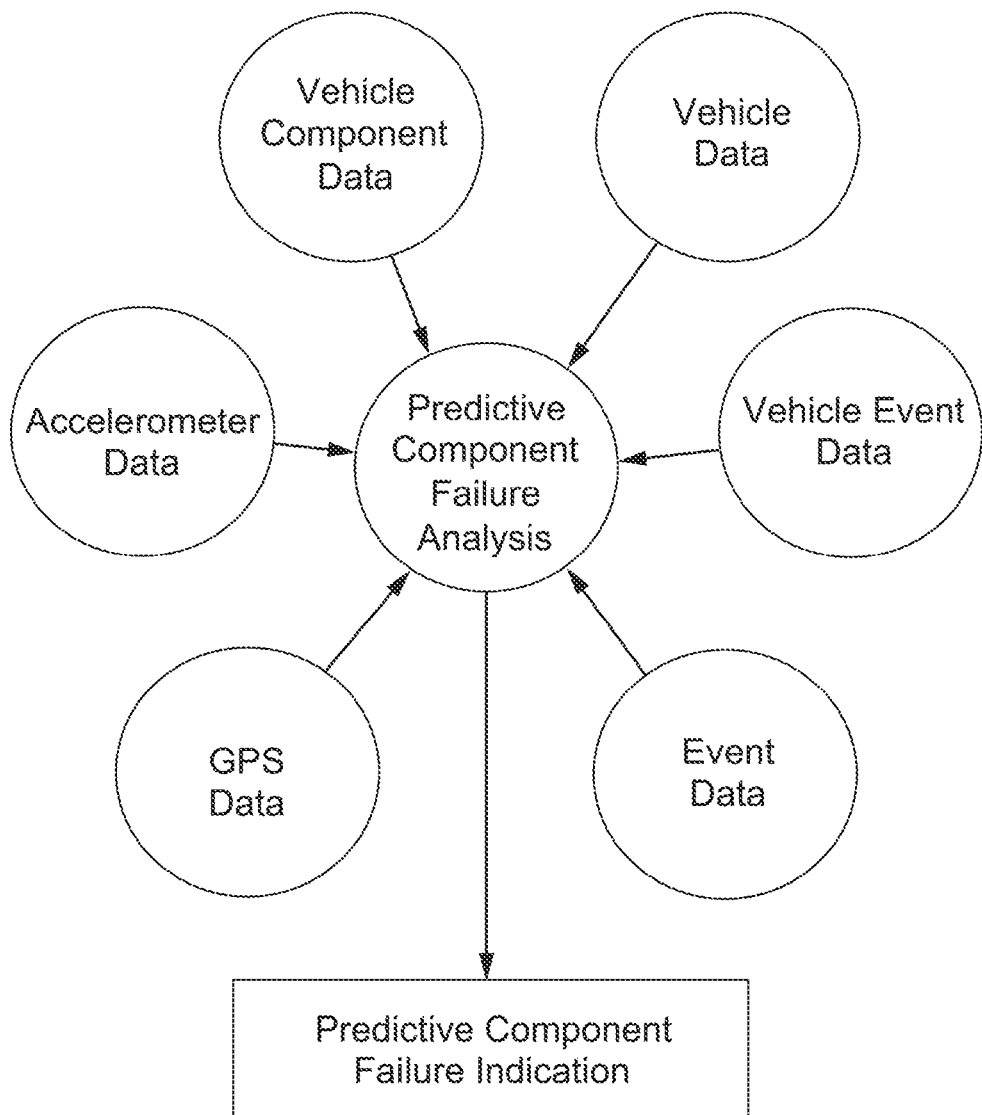
FIG. 12 is a diagrammatic view illustrating different sources of raw data for vehicle component failure analysis and prediction.

Referring now to FIG. 12, the different types of raw telematics data useful alone or in combination for predictive component failure and maintenance validation are described. The vehicular telemetry hardware system 30 has the capability to monitor and log many different types of telematics data to include GPS data, accelerometer data, vehicle component data (data specific to the component being assessed for predictive failure or maintenance validation), vehicle data and vehicle event data. In addition, event data may be supplemented to the log of raw telematics data provided by the vehicular telemetry hardware system 30. The predictive component failure analysis process uses the raw telematics data and event data to provide a predictive component failure indication, a recommendation for maintenance and validation or indication of a maintenance activity.

The GPS module 33 provides GPS data in the form of latitude and longitude data, time data and speed data that may be applied to indicate motion of a vehicle. The accelerometer 34 provides accelerometer data that may be applied to indicate forward motion or reverse motion of the vehicle.

Vehicle data includes the first category of raw telematics vehicle data and information such as a vehicle component type or identification, vehicle speed, engine RPM and two subsets of data. The first subset of data is the vehicle component data. Vehicle component data is specific parameters monitored over the life cycle and logged for a particular vehicle component being assessed for predictive component failure. For example, if the vehicle component is a vehicle battery, then raw battery voltages and minimum cranking voltages are monitored and logged. The second subset of data is vehicle event data. This may be a combination of vehicle data applied or associated with a vehicle event or a vehicle component event. For example, if the vehicle component is a vehicle battery and the event is a cranking event, then the vehicle data event may include one or more of ignition on data, engine RPM data, decrease in battery voltage data, speed data and/or accelerometer data.

Event data typically includes a record of a vehicle event. This may include one or more of a maintenance event, a repair event or a failure event. For example, with a vehicle battery the maintenance event would be a record of charging or boosting a battery. A repair event would be a record of replacing the battery. A failure event would be a record of a dead battery. Event data typically includes a date and time associated with each event.

Telematics Predictive Component Event Pre-Failure Determination Process

Figure 13:
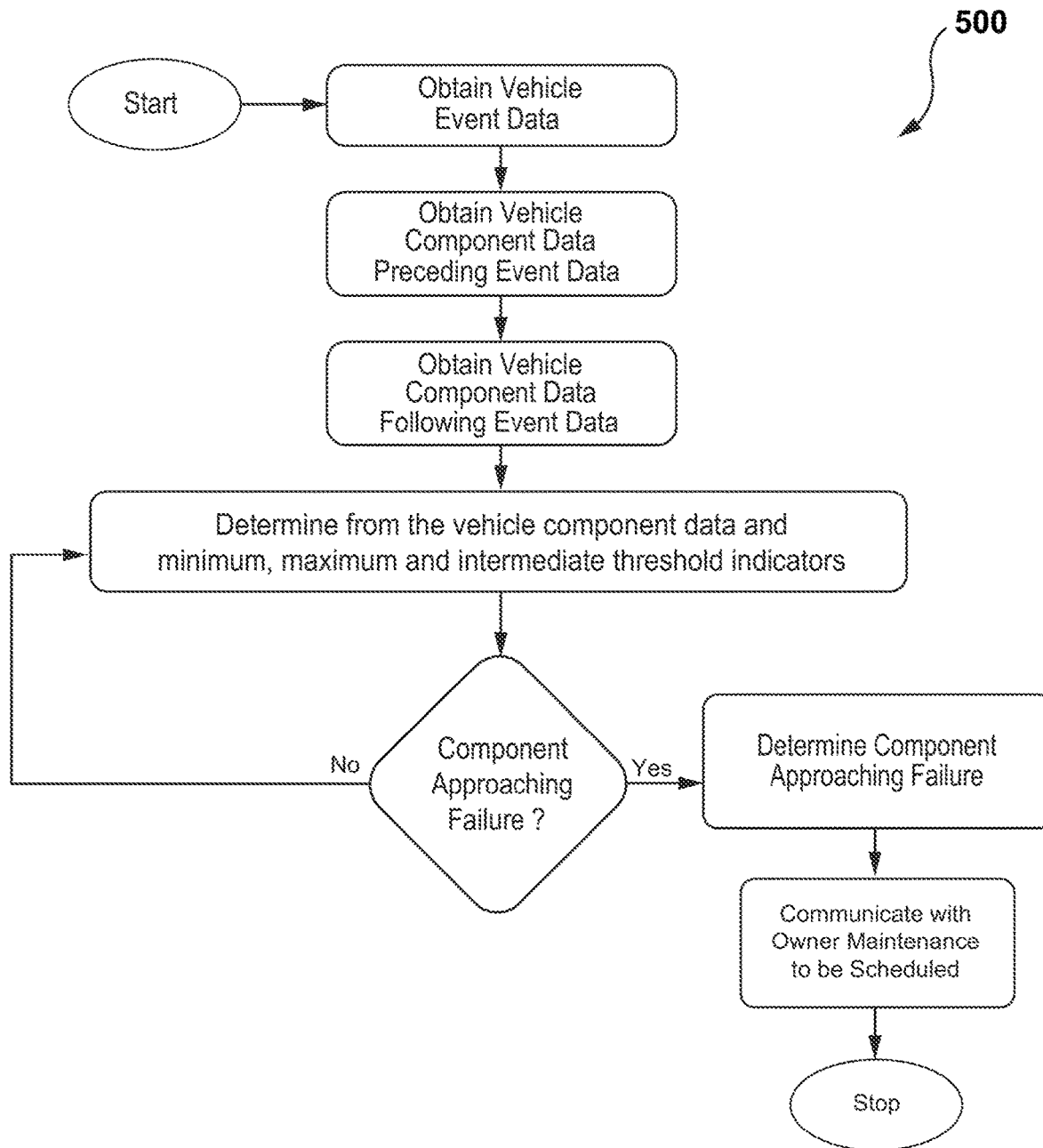
FIG. 13 is a diagrammatic view of a process for predictive component pre-failure analysis.

Referring now to FIG. 13, the predictive component pre-failure analysis process is described. The predictive component pre-failure analysis process is generally indicated at 500. This process and logic may be implemented in a server 19 or in a computing device 20 or in a vehicular telematics hardware system 30 or a combination of a server, computing device and vehicular telematics hardware system. This process may also be implemented as a system including a vehicular telematics hardware system 30 and a remote device 44. Finally, this process may also be implemented as an apparatus that includes a vehicular telematics hardware system 30. The process begins by receiving historical data. The historical data includes vehicle event data and raw telematics data 200. The raw telematics data 200 includes vehicle component data. The vehicle component data includes vehicle component data before one or more vehicle events and after one or more vehicle events. Vehicle component data is the historical operational data obtained over time from a vehicular telemetry hardware system 30 (see FIG. 1). Vehicle component data includes operational data for at least one vehicle component. Vehicle component data is also the life cycle data for a component from a new installation to failure situation.

Vehicle component data includes operational component data from at least one type of vehicle based upon fuel based vehicles, hybrid based vehicles or electric based vehicles. The broad categories include: fuel and air metering, emission control, ignition system control, vehicle idle speed control, transmission control and hybrid propulsion. These broad categories are based upon industry OBDII fault or trouble codes either generic or vehicle manufacturer specific. The vehicle component data may include one or more data generated by thermostat or temperature sensors (oil, fuel, coolant, transmission fluid, electric motor coolant, battery, hydraulic system), pressure sensors (oil, fuel, crankcase, hydraulic system), or other vehicle components, sensors or solenoids (fuel volume, fuel shut off, camshaft position, crankshaft position, O2, turbocharger, waste gates, air injections, mass air flow, throttle body, fuel and air metering, emissions, throttle position, fuel delivery, fuel timing, system lean, system rich, injectors, cylinder timing, engine speed conditions, charge air cooler bypass, fuel pump relay, intake air flow control, misfire (plugs, leads, injectors, ignition coils, compression), rough road, crankshaft position, camshaft position, engine speed, knock, glow plug, exhaust gas recirculation, air injection, catalytic convertor, evaporative emission, vehicle speed, brake switch, idle speed control, throttle position, idle air control, crankcase ventilation, air conditioning, power steering, system voltage, engine control module, throttle position, starter motor, alternator, fuel pump, throttle accelerator, transmission control, torque converter, transmission fluid level, transmission speed, output shaft speed, gear positions, transfer box, converter status, interlock, torque, powertrain, generator, current, voltage, hybrid battery pack, cooling fan, inverter and battery).

An example of vehicle component data is battery voltages during operational use of a vehicle battery or battery voltages based upon a cranking event. The cranking event produces a minimum battery voltage followed by a maximum battery voltage as the battery is recharging to replace the energy used by a vehicle starter motor.

The vehicle event data typically includes a date, or date and time, and the type of vehicle event. The type of vehicle event may be failure, maintenance or service. For example, a failure of a vehicle battery is when the vehicle would not start. Maintenance of a vehicle battery could be replacement of the vehicle battery. Service of a vehicle battery could be a boost.

For each vehicle component under analysis, the moving average 218 from the vehicle component data may be determined. Alternatively, an average moving range or median moving range may be determined. For each vehicle component under analysis, the minimum operational threshold value may be determined at failure 300 and the maximum operational threshold value 310 may be determined when the vehicle component is replaced by a new component.

The next sequence in the process is component approaching failure analysis. Component approaching failure analysis uses the component event data and one or more of the predictive threshold values. In embodiments, the analysis compares the determined data values from the component data before the component event, or after the component event, or before and after the component event. The analysis determines a component approaching failure. For the vehicle component data preceding the vehicle event data point, if the data value decreases over time from the maximum component threshold value to the minimum component threshold value, then when the moving average decreases to the intermediate threshold value a component approaching failure or pre-failure signal is indicated.

The next sequence in the process is to communicate and/or schedule with the owner of the vehicle a maintenance call for the vehicle due to the pre-failure signal being triggered. This communication may comprise for example internet portal access by the owner to the remote device 44 to see vehicles having triggered pre-failure signals, or it may comprise the remote device sending and electronic messages to the owner of the pre-failure signals and notification that vehicle maintenance servicing is imminently due.

Figure 14:
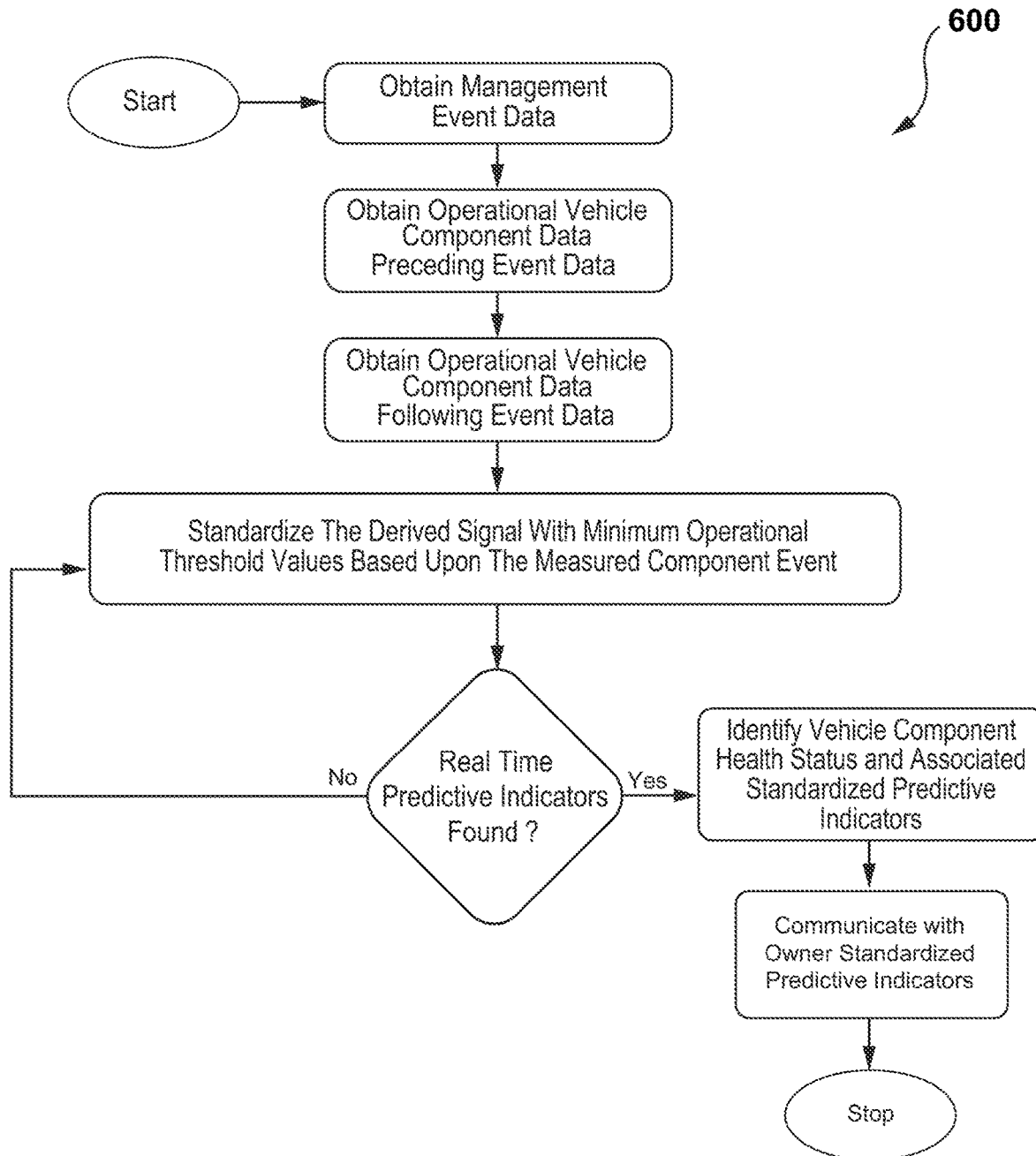
FIG. 14 is a diagrammatic view of a process for determining standardized predictive heath status indicators of vehicle component status.
Figure 15:
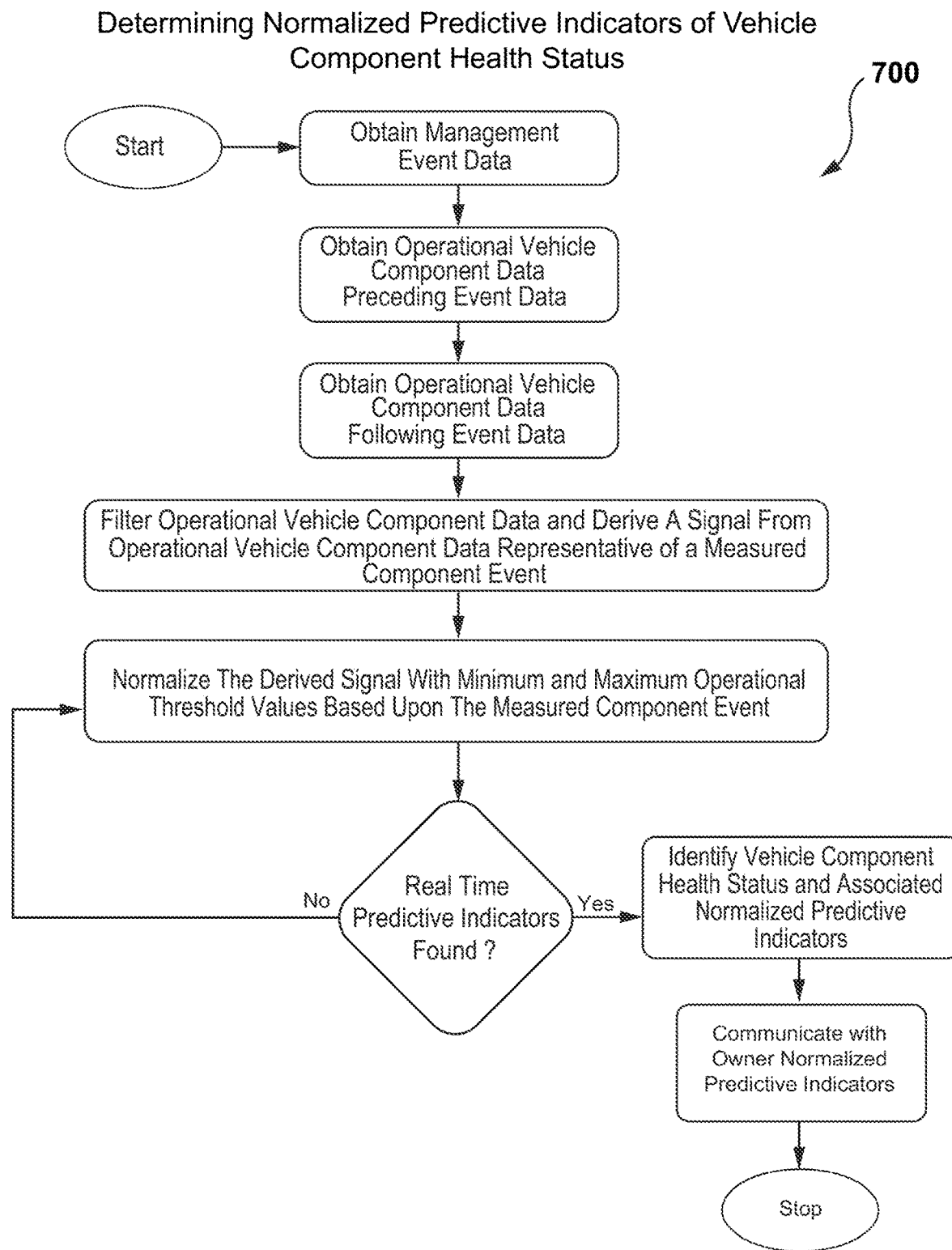
FIG. 15 is a diagrammatic view of a process for determining normalized predictive heath status indicators of vehicle component status.

Telematics Standardized and Normalized Predictive Indicators of Vehicle Component Health Status Referring now to FIGS. 14 and 15 determining and identifying standardized and normalized predictive indicators of vehicle component status are described respectively at 600 for FIGS. 14 and 700 for FIG. 15. This process and logic may be implemented in a server 19 or in a computing device 20 or in a vehicular telematics hardware system 30 or a combination of a server, computing device and vehicular telematics hardware system. This process may also be implemented as a system including a vehicular telematics hardware system 30 and a remote device 44. Finally, this process may also be implemented as an apparatus that includes a vehicular telematics hardware system 30. The determining standardizing process is illustrated at 600 in FIG. 14 and determining normalization process is illustrated at 700 in FIG. 15. Both processes may be implemented as a method or as a system. In the case of a system, the system includes a telematics hardware device 30 and a remote device 44. The telematics hardware device 30 monitors and logs operational component data. This data includes operational values from various vehicle components. The operational component data also includes vehicle component data based upon measured component events such as a cranking event. The operational component data is communicated from the telematics hardware device 30 to remote device 44. Over time, the logs of operational data provide an operational life cycle view of vehicles components from new to failure.

In addition, management event data is also captured over time. Management data provides vehicle component records in the form of component or vehicle events. Vehicle component events may be a failure event, a repair event or a replace event depending upon the corrective action of a management event.

The processes each begin by accessing or obtaining management event data. Then, operational vehicle component data is accessed or obtained prior to a management event data point and following a management event data point (prior and post). In FIG. 15, the operational vehicle component data is filtered. Filtering provides a moving average or a running average of the operational vehicle component data. In addition, signals are derived from the operational vehicle component data. The derived signals may be identified between a lower control limit and an upper control limit or between a mean and upper control limit. The derived signals are representative of a measured component event, for example a cranking event. A cranking event is an example of an operational event that places a high operational load on a vehicle component within the limits of the component. The cranking event provides a series of battery voltages starting with the ignition on voltage, a voltage representative of an active starter motor, a voltage after cranking where the battery is charging followed by a recovery voltage as energy is replaced into the battery following the cranking event. A lower cranking event voltage produces more signals. The operational component data is associated with the management event data typically by database records.

A check for real time predictive indicators occurs to identify potential real time predictive indicators of operational vehicle component status. In embodiment of FIG. 14, the check involves standardizing the derived signal with a minimum operational threshold value that is based on the measured component event. The results of the standardization identify vehicle component heath status and associated predictive indicators of component status that are real time indications relative to a mean of zero associated with the failing condition of the battery that can be compared across vehicle components of different classes. In an embodiment of FIG. 15 the check involves normalizing the filtered derived signal with minimum and maximum operational threshold values that are based upon the measured component event. The results of the normalization identify vehicle component heath status and associated predictive indicators of component status that are real time indications of the rating of the component that in an embodiment are scaled to be between a range of 0 and 100 of the battery and that can be compared across vehicle components of different classes. A monitoring indicator framework may also be associated with the operational component data and the management event data. The monitoring indicator framework may include different normalized values between 100 and 0 that represent the component heath status rating from a new condition progressing to a failure condition. With the normalization or standardization of the vehicle component health status, a real time indication of the actual health of the vehicle component is realized independent of states of health.

The next step in these processes is to communicate with the owner respectively the standardized and normalized real predictive indicators. This communication may comprise internet portal access by the owner to the standardized and normalized real predictive indicators in the remote device 44, or it may comprise the remote device sending and electronic message to the owner of the standardized and normalized real predictive indicators.

Telematics Predictive Indicators of Vehicle Component Remaining Effective Live

Figure 16:
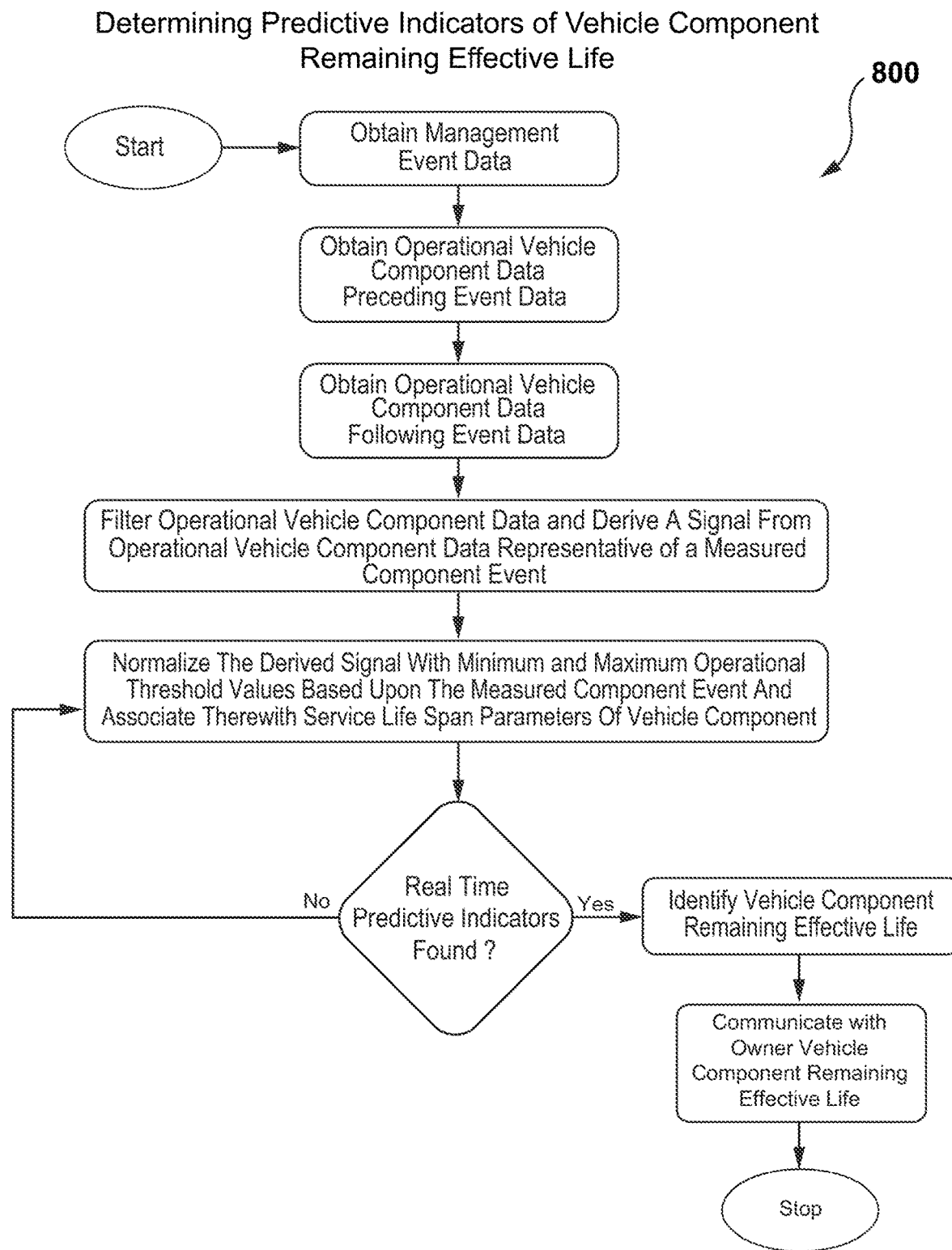
FIG. 16 is a diagrammatic view of a process for determining predictive indicators of vehicle component remaining effective life.

Referring now to FIG. 16 a process of determining remaining effective life of a vehicle component is illustrated at 800. This process and logic may be implemented in a server 19 or in a computing device 20 or in a vehicular telematics hardware system 30 or a combination of a server, computing device and vehicular telematics hardware system. This process may also be implemented as a system including a vehicular telematics hardware system 30 and a remote device 44. Finally, this process may also be implemented as an apparatus that includes a vehicular telematics hardware system 30. The process may be implemented as a method or as a system. In the case of a system, the system includes a telematics hardware device 30 and a remote device 44. The telematics hardware device 30 monitors and logs operational component data. This data includes operational values from various vehicle components. The operational component data also includes vehicle component data based upon measured component events such as a cranking event. The operational component data is communicated from the telematics hardware device 30 to remote device 44. Over time, the logs of operational data provide an operational life cycle view of vehicles components from new to failure.

In addition, management event data is also captured over time. Management data provides vehicle component records in the form of component or vehicle events. Vehicle component events may be a failure event, a repair event or a replace event depending upon the corrective action of a management event.

The process 800 begins by access or obtaining management event data. Then, operational vehicle component data is accessed or obtained prior to a management event data point and following a management event data point (prior and post). The operational vehicle component data may be filtered. Filtering provides a moving average or a running average of the operational vehicle component data. In addition, signals are derived from the operational vehicle component data. The derived signals may be identified between a lower control limit and an upper control limit or between a mean and upper control limit. The derived signals are representative of a measured component event, for example a cranking event. A cranking event is an example of an operational event that places a high operational load on a vehicle component within the limits of the component. The cranking event provides a series of battery voltages starting with the ignition on voltage, a voltage representative of an active starter motor, a voltage after cranking where the battery is charging followed by a recovery voltage as energy is replaced into the battery following the cranking event. A lower cranking event voltage produces more signals. The operational component data is associated with the management event data typically by database records. The operational vehicle component datat and derived signal is filtered by a moving average as discussed prior.

A check for real time predictive indicators occurs to identify potential real time predictive indicators of operational vehicle component status. In an embodiment the check involves normalizing the derived signal with minimum and maximum operational threshold values that are based upon the measured component event. The results of the normalization identify vehicle component heath status and associated predictive indicators of component status that are real time indications of the rating of the component in an embodiment to be between a range of 0 and 1. The normalized derived signal is then associated with service life span parameters of the vehicle component to identify the vehicle component remaining effective life parameters.

The next sequence in the process is to communicate with the owner of the identified vehicle component remaining effective life parameters. This communication may comprise internet portal access by the owner to the remote device 44 to see vehicles having triggered pre-failure signals, or it may comprise the remote device sending and electronic message to the owner of the pre-failure signals and notification that vehicle maintenance servicing is imminently due.

Technical Effects

Embodiments described herein provide one or more technical effects and improvements, for example, an ability to determine and derive monitoring indicator ranges and metrics and signal monitoring values from component life cycle use data; an ability to predict component failure, premature component replacement, an ability to monitor the condition of a component in real time; an ability to provide vehicle component replacement indications in real time in advance of a component failure event to optimize the useful life of a vehicle component before failure; an ability to provide a rating system that can be utilized uniformly by a fleet owner to predict the health status of the vehicle component or vehicle components in the owner's fleet; and/or an ability to predict the remaining effective life of a vehicle component in vehicles of a fleet owner.

While the invention has been described in terms of specific embodiments, it is apparent that other forms could be adopted by one skilled in the art. For example, the methods described herein could be performed in a manner which differs from the embodiments described herein. The steps of each method could be performed using similar steps or steps producing the same result but which are not necessarily equivalent to the steps described herein. Some steps may also be performed in different order to obtain the same result. Similarly, the apparatuses and systems described herein could differ in appearance and construction from the embodiments described herein, the functions of each component of the apparatus could be performed by components of different construction but capable of a similar though not necessarily equivalent function, and appropriate materials could be substituted for those noted. Accordingly, it should be understood that the invention is not limited to the specific embodiments described herein. It should also be understood that the phraseology and terminology employed above are for the purpose of disclosing the illustrated embodiments, and do not necessarily serve as limitations to the scope of the invention.

What is claimed is:

1. A method for identifying real time component health status parameters of a vehicle component, the method comprising:

obtaining, at a telematics hardware device onboard a vehicle, operational component data of at least one vehicle component;

accessing, by a remote device, at least one record of operational component data, said operational component data including operational values from at least one vehicle component from at least one vehicle, said operational values representative of operational life cycle use of said at least one vehicle component, said operational values further based upon a measured component event, determining, by the remote device, at least one threshold operational value representative of health of the vehicle component based upon said measured component event, and associating, by the remote device, the operational component data and the at least one threshold operational value to identify the real time component health status parameters of the vehicle component for real time use in fleet management.

2. The method of claim 1 wherein said determining the at least one threshold operation value determines a minimum operational threshold value based upon the measured component event representative of a failing health condition of the vehicle component.

3. The method of claim 2 wherein said associating standardizes the operational component data with the minimum threshold operational value to identify standardized real time component health status parameters of the vehicle component.

4. The method of claim 2 further comprising the steps of determining an intermediate threshold value based upon said measured component event and greater than the minimum threshold value, triggering a component health pre-failure signal when the identified real time component health status parameters correspond with the intermediate threshold value and communicating the component health pre-failure signal to an owner for the vehicle.

5. The method of claim 1 wherein said determining the at least one threshold operation value determines a minimum operational threshold value (Xmin) representative of a failing health condition of the vehicle component and (Xmax) representative of an optimal health condition of the vehicle component, and said associating normalizes the operational values of the operational component data with the minimum threshold operational value and with the maximum threshold value to identify the normalized real time component health status rating parameters where the normalized real time component health status parameters are one of a probability and numerical value representative of the probability.

6. The method of claim 5 wherein the minimum and maximum operational threshold values are determined from historical vehicle component data having a distribution curve associated with life cycle of the vehicle component from an optimal health condition to a failing health condition.

7. The method of claim 5 wherein each of the normalized real time component health status rating parameters (H) of the vehicle component is derived from:

$H=(X-X\text{min})/(X\text{max}-X\text{min})$, where X represents one of a filtered operational value and a non-filtered operational value, and when X represents the non-filtered operational value said each of the normalized real time component health status rating parameters (H) is subsequently filtered.

8. The method of claim 1 wherein one of the operational component data and the identified real time component health status rating parameters of the vehicle component comprise a filtered moving average of a predetermined number of most recent values thereof.

9. The method of claim 1 wherein said operational values from at least one vehicle component include values representative of thermostat or temperature sensors, oil sensors, fuel sensors, coolant sensors, transmission fluid sensors, electric motor coolant sensors, battery, pressure sensors, oil pressure sensors, fuel pressure sensors, crankcase sensors, hydraulic sensors, fuel volume, fuel shut off, camshaft position sensors, crankshaft position sensors, 02 sensors, turbocharger sensors, waste gate sensors, air injection sensors, mass air flow sensors, throttle body sensors, air metering sensors, emission sensors, throttle position sensors, fuel delivery, fuel timing, system lean, system rich, injectors, cylinder timing, engine speed conditions, charge air cooler bypass, fuel pump sensors, intake air flow control, misfire indications, accelerometer sensors, knock sensors, glow plug sensors, exhaust gas recirculation sensors, air injection sensors, catalytic convertor sensors evaporative emission sensors, brake sensors, idle speed control sensors, throttle position, air conditioning sensors, power steering sensors, system voltages, engine control module values, starter motor voltage, starter motor current, torque converter sensors, fluid sensors, output shaft speed values, gear position, transfer box, converter status, interlock, torque values, hybrid battery pack values, cooling fan values and inverter and battery voltages.

10. The method of claim 1 wherein said operational life cycle includes at least a portion of operational values from a new component to a failed component.

11. The method of claim 1 wherein said measured component event is an event that provides a high operational load within the limits of said at least one vehicle component.

12. The method of claim 1 wherein said measured component event is a cranking event for said at least one vehicle.

13. The method of claim 1 further comprising communicating the real time component health status parameters to an owner of the vehicle.

14. A method for identifying real time health status rating parameters of an electrical system of a vehicle, the method comprising:

obtaining, at a telematics hardware device onboard a vehicle, electrical system component data of at least one electrical component from the vehicle;

receiving, at a remote device, a plurality of voltage signals indicating a change in voltage of a vehicle battery at times associated with a plurality of crankings of a starter motor of the vehicle;

determining, at the remote device, for each of the plurality of voltage signals a minimum voltage (V) of the voltage signal and generating a plurality of minimum voltage signals for a time period;

determining, at the remote device, a minimum operational threshold voltage value (Vmin) representative of a failing health condition of the electrical system during cranking of the starter motor and a maximum operational threshold voltage value (Vmax) representative of an optimal health condition of the electrical system during cranking of the starter motor;

generating, at the remote device, for each of the plurality of minimum voltage signals normalized real time electrical system health status rating parameters based at least in part on normalization of the plurality of minimum voltage signals with the minimum and maximum operational threshold voltage values where the normalized real time component electrical system health status parameters are one of a probability and numerical value representative of the probability; and communicating the normalized real time electrical system health status rating parameters to an owner of the vehicle for real time use in fleet management.

15. The method of claim 14 wherein one of the operational component data and the identified normalized real time component health status rating parameters of the vehicle component are filtered by a moving average of about the 100 most recent values thereof.

16. The method of claim 14 further comprising the steps of determining an intermediate threshold voltage value associated with cranking of the starter motor that is greater than the minimum threshold value, triggering a component health pre-failure signal when one or more of said plurality of minimum voltage signals and the normalized real time component electrical system health status parameters correspond with the intermediate threshold value, and communicating the component health pre-failure signal to an owner of the vehicle.

17. The method of claim 16 further includes the steps of normalizing the intermediate threshold value relative to the minimum and maximum threshold values, triggering the component health pre-failure signal when the identified normalized real time component health status parameters correspond with the normalized intermediate threshold value and communicating the pre-failure signal to the owner of the vehicle.

18. The method of claim 14 wherein the minimum and maximum operational threshold voltage values are determined from historical vehicle component data having a distribution curve associated with life cycle of the battery from an optimal health condition to a failing health condition.

19. The method of claim 14 wherein each of the normalized real time electrical system health status rating parameters (H) of the vehicle is derived from:

$$H=(V-V\min)/(V\max-V\min),$$

where V represents one of a filtered and a non-filtered minimum voltage of the voltage signal (V), and when V is non-filtered said each of the normalized real time electrical system health status rating parameters (H) is subsequently filtered.

20. The method of claim 14 wherein the normalized real time electrical system health status rating parameters are representative of at least one of a battery status, battery cable status, starter motor status and alternator status.

21. The method of claim 14 wherein the normalized real time electrical system health status rating parameters is scaled by a factor of 100.

22. The method of claim 14 further comprising applying the method to a plurality of vehicles in a fleet of vehicles to generate the normalized real time electrical system health status rating parameters for the plurality of vehicles in the fleet, and communicating the normalized real time electrical system health status rating parameters to a fleet owner of the fleet of vehicles.

23. A method for identifying real time health status parameters of an electrical system of a vehicle, the method comprising:
  obtaining, at a telematics hardware device onboard a vehicle, electrical system component data of at least one electrical component from the vehicle;
  receiving, at a remote device, a plurality of voltage signals indicating a change in voltage of a vehicle battery at times associated with a plurality of crankings of a starter motor of the vehicle;
  determining, at the remote device, for each of the plurality of voltage signals a minimum voltage (V) of the voltage signal and generating a plurality of minimum voltage signals for a time period;
  determining, at the remote device, a minimum operational threshold voltage value (Vmin) representative of a failing health condition of the electrical system during cranking of the starter motor;
  generating, at the remote device, for each of the plurality of minimum voltage signals standardized real time electrical system health status parameters based at least in part on scaling of the plurality of minimum voltage signals with the minimum operational threshold voltage; and,
  communicating the standardized real time electrical system health status rating parameters to an owner of the vehicle for real time use in fleet management.

24. The method of claim 23 further comprising the steps of determining an intermediate threshold voltage value during cranking of the starter motor that is greater than the minimum threshold value, triggering a component health pre-failure signal when one or more of said plurality of minimum voltage signals corresponds with the intermediate threshold value and communicating the component health pre-failure signal to the owner for the vehicle.

25. The method of claim 23 wherein determining of said minimum operational threshold voltage value is derived from historical vehicle component data having a distribution curve associated with life cycle of the battery from an optimal health condition to a failing health condition.

26. The method of claim 23 wherein the standardized real time electrical system health status parameters are representative of at least one of a battery status, battery cable status, starter motor status and alternator status.

27. The method of claim 23 further comprising applying the method to a plurality of vehicles in a fleet of vehicles to generate the standardized real time electrical system health status rating parameters for the plurality of vehicles in the fleet, and communicating the standardized real time electrical system health status rating parameters to a fleet owner for the fleet of vehicles.

* * * * *